(12) United States Patent
Lu

(10) Patent No.: US 10,718,871 B2
(45) Date of Patent: Jul. 21, 2020

(54) MOBILE TERMINAL CONTROL METHOD, APPARATUS, AND SYSTEM

(71) Applicant: Huawei Technologies Co., Ltd., Shenzhen (CN)

(72) Inventor: Henghui Lu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 325 days.

(21) Appl. No.: 15/577,120

(22) PCT Filed: May 26, 2015

(86) PCT No.: PCT/CN2015/079841
§ 371 (c)(1),
(2) Date: Nov. 27, 2017

(87) PCT Pub. No.: WO2016/187817
PCT Pub. Date: Dec. 1, 2016

(65) Prior Publication Data
US 2018/0180744 A1 Jun. 28, 2018

(51) Int. Cl.
*G01S 19/48* (2010.01)
*H04W 64/00* (2009.01)
(Continued)

(52) U.S. Cl.
CPC ............ *G01S 19/48* (2013.01); *G01S 5/0205* (2013.01); *G01S 5/10* (2013.01); *H04W 64/00* (2013.01); *G01S 3/02* (2013.01)

(58) Field of Classification Search
CPC .......... G01S 19/41; G01S 19/48; G01S 19/07; G01S 19/44; G01S 5/0205; G01S 5/10; G01S 5/0027; H04W 64/00
(Continued)

(56) References Cited

U.S. PATENT DOCUMENTS 9,482,739 B2  11/2016  Mole et al.
9,976,860 B2  5/2018  Varoglu et al.
(Continued)

FOREIGN PATENT DOCUMENTS

CN  1832627 A  9/2006
CN  102333351 A  1/2012
(Continued)

OTHER PUBLICATIONS

Machine Translation and Abstract of Chinese Publication No. CN102333351, Jan. 25, 2012, 21 pages.
(Continued)

*Primary Examiner* — Harry K Liu
(74) *Attorney, Agent, or Firm* — Conley Rose, P.C.

(57) ABSTRACT

A mobile terminal control method includes receiving N direction-finding signals that are respectively sent by a multiple-antenna node at N moments, where the multiple-antenna node is located in an indoor-outdoor critical area. The method includes obtaining N pieces of location relationship information between a mobile terminal and the multiple-antenna node at the N moments according to the N direction-finding signals, where the N moments and the N pieces of location relationship information are in a one-to-one correspondence. The method includes determining location relationship change information between the mobile terminal and the multiple-antenna node according to at least M of the N pieces of location relationship information, where 2≤M≤N. The method includes controlling the mobile terminal by matching the location relationship change information and according to the location relationship change information.

20 Claims, 8 Drawing Sheets

(51) Int. Cl.
*G01S 5/02* (2010.01)
*G01S 5/10* (2006.01)
*G01S 3/02* (2006.01)

(58) Field of Classification Search
USPC .................................................. 342/357.31
See application file for complete search history.

(56) References Cited

U.S. PATENT DOCUMENTS

| | | | |
|---|---|---|---|
| 10,168,161 | B2 | 1/2019 | Park |
| 2014/0004876 | A1 | 1/2014 | Fuller et al. |
| 2014/0031092 | A1 | 1/2014 | Hohteri et al. |
| 2014/0114568 | A1 | 4/2014 | Park |
| 2014/0162693 | A1* | 6/2014 | Wachter ............... H04W 4/021 455/456.3 |
| 2014/0192658 | A1 | 7/2014 | Venkatraman et al. |
| 2014/0251142 | A1 | 9/2014 | Firnhaber et al. |
| 2014/0274136 | A1* | 9/2014 | Edge ................. H04W 4/029 455/456.2 |
| 2014/0295880 | A1* | 10/2014 | Ranki ..................... G01S 3/18 455/456.1 |
| 2015/0133173 | A1* | 5/2015 | Edge ....................... G01S 1/66 455/456.6 |
| 2015/0223191 | A1* | 8/2015 | Lopes ................... H04W 64/00 455/456.1 |

FOREIGN PATENT DOCUMENTS

| | | |
|---|---|---|
| CN | 102645666 A | 8/2012 |
| CN | 103513227 A | 1/2014 |
| CN | 104023388 A | 9/2014 |
| WO | 2009075514 A2 | 6/2009 |

OTHER PUBLICATIONS

Machine Translation and Abstract of Chinese Publication No. CN102645666, Aug. 22, 2012, 18 pages.
Machine Translation and Abstract of Chinese Publication No. CN104023388, Sep. 3, 2014, 14 pages.
Foreign Communication From a Counterpart Application, PCT Application No. PCT/CN2015/079841, English Translation of International Search Report dated Feb. 5, 2016, 2 pages.
Foreign Communication From a Counterpart Application, PCT Application No. PCT/CN2015/079841, English Translation of Written Opinion dated Feb. 5, 2016, 7 pages.
Foreign Communication From a Counterpart Application, European Application No. 15892898.6, Extended European Search Report dated May 8, 2018, 9 pages.
Machine Translation and Abstract of Chinese Publication No. CN1832627, Sep. 13, 2006, 6 pages.
Foreign Communication From a Counterpart Application, Chinese Application No. 201580029177.7, Chinese Office Action dated Mar. 11, 2019, 9 pages.

* cited by examiner

MOBILE TERMINAL CONTROL METHOD, APPARATUS, AND SYSTEM

CROSS-REFERENCE TO RELATED APPLICATION

This application is a National Stage of International Application No. PCT/CN2015/079841, filed on May 26, 2015, which is hereby incorporated by reference in its entirety.

TECHNICAL FIELD

Embodiments of the disclosure relate to a positioning technology, and in particular, to a mobile terminal control method, an apparatus, and a system.

BACKGROUND

Positioning in different environments generally needs to use different positioning technologies. For example, a Global Navigation Satellite System (GNSS) positioning technology is generally used to support positioning in an outdoor environment; a wireless-fidelity (Wi-Fi) positioning technology, a BLUETOOTH positioning technology, and the like are generally used to support positioning in an indoor environment.

Selection of a conventional positioning manner usually depends on a signal received by a mobile terminal. The signal herein may be a GNSS satellite signal, or may be a cellular base station signal, a Wi-Fi signal, or the like. However, because a dependence signal is susceptible to non-line-of-sight (NLOS) transmission, an environment factor, and the like when a conventional navigation positioning manner is selected, a relatively large error is often introduced. Consequently, a location of the mobile terminal is erroneously determined, and an inappropriate positioning manner is selected. Using GNSS as an example, a GNSS satellite signal is extremely easily sheltered by high buildings, trees, or the like. Therefore, in an urban valley area (such as a street at two sides of which are high buildings), a case in which there are only a few GNSS visible satellites, and signal strength is relatively low occurs. In this case, it is extremely easy to erroneously determine that the mobile terminal enters an indoor environment, and switching to an indoor positioning manner or loading of an indoor navigation map is erroneously performed.

SUMMARY

Embodiments of the disclosure provide a mobile terminal control method, an apparatus, and a system, so as to improve mobile terminal control accuracy.

According to a first aspect, a mobile terminal control method includes receiving N direction-finding signals that are respectively sent by a multiple-antenna node at N moments, where the multiple-antenna node is located in an indoor-outdoor critical area; obtaining N pieces of location relationship information between a mobile terminal and the multiple-antenna node at the N moments according to the N direction-finding signals, where the N moments and the N pieces of location relationship information are in a one-to-one correspondence; determining location relationship change information between the mobile terminal and the multiple-antenna node according to at least M of the N pieces of location relationship information, where $2 \leq M \leq N$; and controlling the mobile terminal by matching the location relationship change information and according to the location relationship change information.

In a first possible implementation manner of the first aspect, the obtaining N pieces of location relationship information between a mobile terminal and the multiple-antenna node at the N moments according to the N direction-finding signals includes obtaining N azimuths $\varphi$ and N elevation angles $\theta$ between the mobile terminal and the multiple-antenna node at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; $\varphi$ is an angle between a straight line k1 and a positive direction of the x-axis, and the straight line k1 is a connecting line between a projection of the mobile terminal on the ground and the original point; and $\theta$ is an angle between a straight line k2 and a negative direction of the z-axis, and the straight line k2 is a connecting line between the mobile terminal and the multiple-antenna node.

With reference to the first possible implementation manner of the first aspect, in a second possible implementation manner, the controlling the mobile terminal by matching the location relationship change information and according to the location relationship change information includes when $0° \leq \varphi_i \leq 180°$, if $\varphi_1 < \varphi_2 < \ldots < \varphi_M$, controlling the mobile terminal in a first manner, or if $\varphi_1 > \varphi_2 > \ldots > \varphi_M$, controlling the mobile terminal in a second manner; or when $180° \leq \varphi_i \leq 360°$, if $\varphi_1 > \varphi_2 > \ldots > \varphi_M$, controlling the mobile terminal in a first manner, or if $\varphi_1 < \varphi_2 < \ldots < \varphi_M$, controlling the mobile terminal in a second manner; or when $0° \leq \varphi_i \leq 90°$ or $270° \leq \varphi_i \leq 360°$, if $\varphi_1 = \varphi_2 = \ldots = \varphi_M$ and $\theta_1 > \theta_2 > \ldots > \theta_M > 0$, controlling the mobile terminal in a first manner, or if $\varphi_1 = \varphi_2 = \ldots = \varphi_M$ and $0 < \theta_1 < \theta_2 < \ldots < \theta_M$, controlling the mobile terminal in a second manner; or when $90° \leq \varphi_i \leq 270°$, if $\varphi_1 = \varphi_2 = \ldots = \varphi_M$ and $0 < \theta_1 < \theta_2 < \ldots < \theta_M$, controlling the mobile terminal in a first manner, or if $\varphi_1 = \varphi_2 = \ldots = \varphi_M$ and $\theta_1 > \theta_2 > \ldots > \theta_M > 0$, controlling the mobile terminal in a second manner, where $\varphi_i$ is an azimuth at the $i^{th}$ moment, $\theta_i$ is an elevation angle at the $i^{th}$ moment, $1 \leq i \leq M$, the first manner matches a movement trend of the mobile terminal moving from outdoors to indoors, and the second manner matches a movement trend of the mobile terminal moving from indoors to outdoors.

With reference to the first possible implementation manner of the first aspect, in a third possible implementation manner, the controlling the mobile terminal by matching the location relationship change information and according to the location relationship change information includes when $0° \leq \varphi_i \leq 90°$, if $\varphi_1 < \varphi_2 < \ldots < \varphi_M$, and $\theta_1 > \theta_2 > \ldots > \theta_M$, controlling the mobile terminal in a first manner, or if $\varphi_1 > \varphi_2 > \ldots > \varphi_M$, and $\theta_1 < \theta_2 < \ldots < \theta_M$, controlling the mobile terminal in a second manner; or when $90° \leq \varphi_i \leq 180°$, if $\varphi_1 < \varphi_2 < \ldots < \varphi_M$, and $\theta_1 < \theta_2 < \ldots < \theta_M$, controlling the mobile terminal in a first manner, or if $\varphi_1 > \varphi_2 > \ldots > \varphi_M$ and $\theta_1 > \theta_2 > \ldots > \theta_M$, controlling the mobile terminal in a second manner; or when $180° \leq \varphi_i \leq 270°$, if $\varphi_1 < \varphi_2 < \ldots < \varphi_M$, and $\theta_1 > \theta_2 > \ldots > \theta_M$, controlling the mobile terminal in a second manner, or if $\varphi_1 > \varphi_2 > \ldots > \varphi_M$, and $\theta_1 < \theta_2 < \ldots < \theta_M$, controlling the mobile terminal in a first manner; or when $270° \leq \varphi_i \leq 360°$, if $\varphi_1 < \varphi_2 < \ldots < \varphi_M$, and $\theta_1 < \theta_2 < \ldots < \theta_M$, controlling the mobile terminal in a second manner, or if $\varphi_1 > \varphi_2 > \ldots > \varphi_M$, and $\theta_1 > \theta_2 > \ldots > \theta_M$, controlling the mobile terminal in a first manner, where $\varphi_i$ is an azimuth at the $i^{th}$ moment, $\theta_i$ is an elevation angle at the $i^{th}$ moment, $1 \leq i \leq M$, the first manner matches a movement trend of the mobile terminal moving from outdoors to indoors, and the second manner matches a movement trend of the mobile terminal moving from indoors to outdoors.

With reference to the second or third possible implementation manner of the first aspect, in a fourth possible implementation manner, the controlling the mobile terminal in a first manner includes controlling the mobile terminal to use an indoor positioning manner, or controlling the mobile terminal to load an indoor navigation map; and the controlling the mobile terminal in a second manner includes controlling the mobile terminal to use an outdoor positioning manner, or controlling the mobile terminal to load an outdoor navigation map.

With reference to the first aspect or any one of the possible implementation manners of the first aspect, in a fifth possible implementation manner, before the receiving N direction-finding signals that are respectively sent by a multiple-antenna node at N moments, the method further includes when a quantity of visible satellites received by the mobile terminal is less than or equal to a first threshold, establishing, by the mobile terminal, a wireless connection to the multiple-antenna node; or when strength of a Wi-Fi or BLUETOOTH signal detected by the mobile terminal is greater than or equal to a second threshold, establishing, by the mobile terminal, a wireless connection to the multiple-antenna node; or when strength of a Wi-Fi or BLUETOOTH signal detected by the mobile terminal is less than or equal to a third threshold, establishing, by the mobile terminal, a wireless connection to the multiple-antenna node; or when a quantity of Wi-Fi access points or a quantity of BLUETOOTH nodes detected by the mobile terminal is greater than or equal to a fourth threshold, establishing, by the mobile terminal, a wireless connection to the multiple-antenna node; or when a quantity of Wi-Fi access points or a quantity of BLUETOOTH nodes detected by the mobile terminal is less than or equal to a fifth threshold, establishing, by the mobile terminal, a wireless connection to the multiple-antenna node.

With reference to the fourth possible implementation manner of the first aspect, in a sixth possible implementation manner, the indoor positioning manner includes Wi-Fi positioning, BLUETOOTH positioning, magnetic field positioning or light ray positioning.

With reference to the fourth possible implementation manner of the first aspect, in a seventh possible implementation manner, the outdoor positioning manner includes GNSS positioning, cellular network positioning or Wi-Fi positioning.

According to a second aspect, a mobile terminal control method includes respectively sending, by a mobile terminal, N direction-finding signals at N moments to a multiple-antenna node located in an indoor-outdoor critical area; receiving, by the mobile terminal, a control command that is returned by the multiple-antenna node according to the N direction-finding signals; and executing, by the mobile terminal, the control command.

In a first possible implementation manner of the second aspect, the control command includes a first command matching a movement trend of the mobile terminal moving from outdoors to indoors; or a second command matching a movement trend of the mobile terminal moving from indoors to outdoors.

With reference to the first possible implementation manner of the second aspect, in a second possible implementation manner, the control command is the first command, and the executing, by the mobile terminal, the control command includes using, by the mobile terminal, an indoor positioning manner; or loading, by the mobile terminal, an indoor navigation map.

With reference to the first possible implementation manner of the second aspect, in a third possible implementation manner, the control command is the second command, and the executing, by the mobile terminal, the control command includes using, by the mobile terminal, an outdoor positioning manner; or loading, by the mobile terminal, an outdoor navigation map.

According to a third aspect, a multiple-antenna node control method includes receiving, by a multiple-antenna node, N direction-finding signals that are respectively sent by a mobile terminal at N moments, where the multiple-antenna node is located in an indoor-outdoor critical area; obtaining, by the multiple-antenna node, N pieces of location relationship information between the multiple-antenna node and the mobile terminal at the N moments according to the N direction-finding signals, where the N moments and the N pieces of location relationship information are in a one-to-one correspondence; determining, by the multiple-antenna node, location relationship change information between the multiple-antenna node and the mobile terminal according to at least M of the N pieces of location relationship information, where $2 \leq M \leq N$; and sending, by the multiple-antenna node, a control command matching the location relationship change information to the mobile terminal according to the location relationship change information.

In a first possible implementation manner of the third aspect, the obtaining N pieces of location relationship information between the multiple-antenna node and the mobile terminal at the N moments according to the N direction-finding signals includes obtaining N azimuths $\varphi$ and N elevation angles $\theta$ between the multiple-antenna node and the mobile terminal at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; $\varphi$ is an angle between a straight line k1 and a positive direction of the x-axis, and the straight line k1 is a connecting line between a projection of the mobile terminal on the ground and the original point; and $\theta$ is an angle between a straight line k2 and a negative direction of the z-axis, and the straight line k2 is a connecting line between the multiple-antenna node and the mobile terminal.

With reference to the first possible implementation manner of the third aspect, in a second possible implementation manner, the sending, by the multiple-antenna node, a control command matching the location relationship change information to the mobile terminal according to the location relationship change information includes when $0° \leq \varphi_i \leq 180°$, if $\varphi_1 < \varphi_2 < \ldots < \varphi_M$, sending, by the multiple-antenna node, a first command to the mobile terminal, or if $\varphi_1 > \varphi_2 > \ldots > \varphi_M$, sending, by the multiple-antenna node, a second command to the mobile terminal; or when $180° \leq \varphi_i \leq 360°$, if $\varphi_1 > \varphi_2 > \ldots > \varphi_M$, sending, by the multiple-antenna node, a first command to the mobile terminal, or if $\varphi_1 < \varphi_2 < \ldots < \varphi_M$, sending, by the multiple-antenna node, a second command to the mobile terminal; or when $0° \leq \varphi_i \leq 90°$ or $270° \leq \varphi_i \leq 360°$, if $\varphi_1 = \varphi_2 = \ldots = \varphi_M$ and $\theta_1 > \theta_2 > \ldots > \theta_M > 0$, sending, by the multiple-antenna node, a first command to the mobile terminal, or if $\varphi_1 = \varphi_2 = \ldots = \varphi_M$ and $0 < \theta_1 < \theta_2 < \ldots < \theta_M$, sending, by the multiple-antenna node, a second command to the mobile terminal; or when $90° \leq \varphi_i \leq 270°$, if $\varphi_1 = \varphi_2 = \ldots = \varphi_M$ and $0<\theta_1<\theta_2<\ldots<\theta_M$, sending, by the multiple-antenna node, a first command to the mobile terminal, or if $\varphi_1=\varphi_2=\ldots=\varphi_M$ and $\theta_1>\theta_2>\ldots>\theta_M>0$, sending, by the multiple-antenna node, a second command to the mobile terminal, where $\varphi_i$ is an azimuth at the $i^{th}$ moment, $\theta_i$ is an elevation angle at the $i^{th}$ moment, $1\le i\le M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

With reference to the first possible implementation manner of the third aspect, in a third possible implementation manner, the sending, by the multiple-antenna node, a control command matching the location relationship change information to the mobile terminal according to the location relationship change information includes when $0°\le\varphi_i\le 90°$, if $\varphi_1<\varphi_2<\ldots<\varphi_M$, and $\theta_1>\theta_2>\ldots>\theta_M$, sending, by the multiple-antenna node, a first command to the mobile terminal, or if $\varphi_1>\varphi_2>\ldots>\varphi_M$, and $\theta_1<\theta_2<\ldots<\theta_M$, sending, by the multiple-antenna node, a second command to the mobile terminal; or when $90°\le\varphi_i\le 180°$, if $\varphi_1<\varphi_2<\ldots<\varphi_M$, and $\theta_1<\theta_2<\ldots<\theta_M$, sending, by the multiple-antenna node, a first command to the mobile terminal, or if $\varphi_1>\varphi_2>\ldots>\varphi_M$, and $\theta_1>\theta_2>\ldots>\theta_M$, sending, by the multiple-antenna node, a second command to the mobile terminal; or when $180°\le\varphi_i\le 270°$, if $\varphi_1<\varphi_2<\ldots<\varphi_M$, and $\theta_1>\theta_2>\ldots>\theta_M$, sending, by the multiple-antenna node, a second command to the mobile terminal, or if $\varphi_1>\varphi_2>\ldots>\varphi_M$, and $\theta_1<\theta_2<\ldots<\theta_M$, sending, by the multiple-antenna node, a first command to the mobile terminal; or when $270°\le\varphi_i\le 360°$, if $\varphi_1<\varphi_2<\ldots<\varphi_M$, and $\theta_1<\theta_2<\ldots<\theta_M$, sending, by the multiple-antenna node, a second command to the mobile terminal, or if $\varphi_1>\varphi_2>\ldots>\varphi_M$, and $\theta_1>\theta_2>\ldots>\theta_M$, sending, by the multiple-antenna node, a first command to the mobile terminal, where $\varphi_i$ is an azimuth at the $i^{th}$ moment, $\theta_i$ is an elevation angle at the $i^{th}$ moment, $1\le i\le M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

With reference to the second or third possible implementation manner of the third aspect, in a fourth possible implementation manner, the first command is used to instruct the mobile terminal to use an indoor positioning manner, or the first command is used to instruct the mobile terminal to load an indoor navigation map; and the second command is used to instruct the mobile terminal to use an outdoor positioning manner, or the second command is used to instruct the mobile terminal to load an outdoor navigation map.

With reference to the third aspect or any one of the possible implementation manners of the third aspect, in a fifth possible implementation manner, before the receiving, by a multiple-antenna node, N direction-finding signals that are respectively sent by a mobile terminal at N moments, the method further includes establishing a wireless connection between the multiple-antenna node and the mobile terminal.

With reference to the third aspect or any one of the possible implementation manners of the third aspect, in a sixth possible implementation manner, the multiple-antenna node includes a multiple-antenna Wi-Fi node, or a multiple-antenna BLUETOOTH node.

According to a fourth aspect, a mobile terminal control apparatus is characterized in that the control apparatus is included in a mobile terminal, and the control apparatus includes a receiving unit, configured to receive N direction-finding signals that are respectively sent by a multiple-antenna node at N moments, where the multiple-antenna node is located in an indoor-outdoor critical area; an information obtaining unit, configured to obtain N pieces of location relationship information between the mobile terminal and the multiple-antenna node at the N moments according to the N direction-finding signals, where the N moments and the N pieces of location relationship information are in a one-to-one correspondence; a determining unit, configured to determine location relationship change information between the mobile terminal and the multiple-antenna node according to at least M of the N pieces of location relationship information, where $2\le M\le N$; and a control unit, configured to control the mobile terminal by matching the location relationship change information and according to the location relationship change information.

In a first possible implementation manner of the fourth aspect, the information obtaining unit is specifically configured to: obtain N azimuths $\varphi$ and N elevation angles $\theta$ between the mobile terminal and the multiple-antenna node at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; $\varphi$ is an angle between a straight line k1 and a positive direction of the x-axis, and the straight line k1 is a connecting line between a projection of the mobile terminal on the ground and the original point; and $\theta$ is an angle between a straight line k2 and a negative direction of the z-axis, and the straight line k2 is a connecting line between the mobile terminal and the multiple-antenna node.

With reference to the first possible implementation manner of the fourth aspect, in a second possible implementation manner, the control unit is specifically configured to: when $0°\le\varphi_i\le 180°$, if $\varphi_1<\varphi_2<\ldots<\varphi_M$, control the mobile terminal in a first manner, or if $\varphi_1>\varphi_2>\ldots>\varphi_M$, control the mobile terminal in a second manner; or when $180°\le\varphi_i\le 360°$, if $\varphi_1>\varphi_2>\ldots>\varphi_M$, control the mobile terminal in a first manner, or if $\varphi_1<\varphi_2<\ldots<\varphi_M$, control the mobile terminal in a second manner; or when $0°\le\varphi_i\le 90°$ or $270°\le\varphi_i\le 360°$, if $\varphi_1=\varphi_2=\ldots=\varphi_M$ and $\theta_1>\theta_2>\ldots>\theta_M>0$, control the mobile terminal in a first manner, or if $\varphi_1=\varphi_2=\ldots=\varphi_M$ and $0<\theta_1<\theta_2<\ldots<\theta_M$, control the mobile terminal in a second manner; or when $90°\le\varphi_i\le 270°$, if $\varphi_1=<\varphi_2=\ldots=\varphi_M$ and $0<\theta_1<\theta_2<\ldots<\theta_M$, control the mobile terminal in a first manner, or if $\varphi_1=\varphi_2=\ldots=\varphi_M$ and $\theta_1>\theta_2>\ldots>\theta_M>0$, control the mobile terminal in a second manner, where $\varphi_i$ is an azimuth at the $i^{th}$ moment, $\theta_i$ is an elevation angle at the $i^{th}$ moment, $1\le i\le M$, the first manner matches a movement trend of the mobile terminal moving from outdoors to indoors, and the second manner matches a movement trend of the mobile terminal moving from indoors to outdoors.

With reference to the first possible implementation manner of the fourth aspect, in a third possible implementation manner, the control unit is specifically configured to: when $0°\le\varphi_i\le 90°$, if $\varphi_1<\varphi_2<\ldots<\varphi_M$, and $\theta_1>\theta_2>\ldots>\theta_M$, control the mobile terminal in a first manner, or if $\varphi_1>\varphi_2>\ldots>\varphi_M$, and $\theta_1<\theta_2<\ldots<\theta_M$, control the mobile terminal in a second manner; or when 90°≤φ$_i$≤180°, if φ$_1$<φ$_2$< . . . <φ$_M$, and θ$_1$<θ$_2$< . . . <θ$_M$, control the mobile terminal in a first manner, or if φ$_1$>φ$_2$> . . . >φ$_M$, and θ$_1$>θ$_2$> . . . >θ$_M$, control the mobile terminal in a second manner; or when 180°≤φ$_i$≤270°, if φ$_1$<φ$_2$< . . . <φ$_M$, and θ$_1$>θ$_2$> . . . >θ$_M$, control the mobile terminal in a second manner, or if φ$_1$>φ$_2$> . . . >φ$_M$, and θ$_1$<θ$_2$< . . . <θ$_M$, control the mobile terminal in a first manner; or when 270°≤φ$_i$≤360°, if φ$_1$<φ$_2$< . . . <φ$_M$, and θ$_1$<θ$_2$< . . . <θ$_M$, control the mobile terminal in a second manner, or if φ$_1$>φ$_2$> . . . >φ$_M$, and θ$_1$>θ$_2$> . . . >θ$_M$, control the mobile terminal in a first manner, where φ$_i$ is an azimuth at the i$^{th}$ moment, θ$_i$ is an elevation angle at the i$^{th}$ moment, 1≤i≤M, the first manner matches a movement trend of the mobile terminal moving from outdoors to indoors, and the second manner matches a movement trend of the mobile terminal moving from indoors to outdoors.

With reference to the second or third possible implementation manner of the fourth aspect, in a fourth possible implementation manner, when controlling the mobile terminal in the first manner, the control unit is specifically configured to: control the mobile terminal to use an indoor positioning manner, or control the mobile terminal to load an indoor navigation map; or when controlling the mobile terminal in the second manner, the control unit is specifically configured to: control the mobile terminal to use an outdoor positioning manner, or control the mobile terminal to load an outdoor navigation map.

With reference to the fourth aspect or any one of the possible implementation manners of the fourth aspect, in a fifth possible implementation manner, the apparatus further includes a connection unit, configured to: before the receiving unit receives the N direction-finding signals that are respectively sent by the multiple-antenna node at the N moments, and when a quantity of visible satellites received by the mobile terminal is less than or equal to a first threshold, establish a wireless connection to the multiple-antenna node; or before the receiving unit receives the N direction-finding signals that are respectively sent by the multiple-antenna node at the N moments, and when strength of a Wi-Fi signal detected by the mobile terminal is greater than or equal to a second threshold, establish a wireless connection to the multiple-antenna node; or before the receiving unit receives the N direction-finding signals that are respectively sent by the multiple-antenna node at the N moments, and when strength of a Wi-Fi signal detected by the mobile terminal is less than or equal to a third threshold, establish a wireless connection to the multiple-antenna node; or before the receiving unit receives the N direction-finding signals that are respectively sent by the multiple-antenna node at the N moments, and when a quantity of Wi-Fi access points or a quantity of BLUETOOTH nodes detected by the mobile terminal is greater than or equal to a fourth threshold, establish a wireless connection to the multiple-antenna node; or before the receiving unit receives the N direction-finding signals that are respectively sent by the multiple-antenna node at the N moments, and when a quantity of Wi-Fi access points or a quantity of BLUETOOTH nodes detected by the mobile terminal is less than or equal to a fifth threshold, establish a wireless connection to the multiple-antenna node.

With reference to the fourth possible implementation manner of the fourth aspect, in a sixth possible implementation manner, the indoor positioning manner includes Wi-Fi positioning, BLUETOOTH positioning, magnetic field positioning or light ray positioning.

With reference to the fourth possible implementation manner of the fourth aspect, in a seventh possible implementation manner, the outdoor positioning manner includes GNSS positioning, cellular network positioning or Wi-Fi positioning.

According to a fifth aspect, a mobile terminal control apparatus, the control apparatus is included in a mobile terminal, and the control apparatus includes a sending unit, configured to respectively send N direction-finding signals at N moments to a multiple-antenna node located in an indoor-outdoor critical area; a receiving unit, configured to receive a control command that is returned by the multiple-antenna node according to the N direction-finding signals; and an execution unit, configured to execute the control command.

In a first possible implementation manner of the fifth aspect, the control command includes a first command matching a movement trend of the mobile terminal moving from outdoors to indoors; or a second command matching a movement trend of the mobile terminal moving from indoors to outdoors.

With reference to the first possible implementation manner of the fifth aspect, in a second possible implementation manner, when the control command is the first command, the execution unit is specifically configured to use an indoor positioning manner, or load an indoor navigation map; or when the control command is the second command, the execution unit is specifically configured to use an outdoor positioning manner, or load an outdoor navigation map.

According to a sixth aspect, a multiple-antenna node control apparatus, the control apparatus is included in a multiple-antenna node, and the control apparatus includes a receiving unit, configured to receive N direction-finding signals that are respectively sent by a mobile terminal at N moments, where the multiple-antenna node is located in an indoor-outdoor critical area; an information obtaining unit, configured to obtain N pieces of location relationship information between the multiple-antenna fixed node and the mobile terminal at the N moments according to the N direction-finding signals, where the N moments and the N pieces of location relationship information are in a one-to-one correspondence; a determining unit, configured to determine location relationship change information between the multiple-antenna fixed node and the mobile terminal according to at least M of the N pieces of location relationship information, where 2≤M≤N; and a control unit, configured to send a control command matching the location relationship change information to the mobile terminal according to the location relationship change information.

In a first possible implementation manner of the sixth aspect, the information obtaining unit is specifically configured to: obtain N azimuths φ and N elevation angles θ between the multiple-antenna fixed node and the mobile terminal at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, and the straight line k1 is a connecting line between a projection of the mobile terminal on the ground and the original point; and θ is an angle between a straight line k2 and a negative direction of the z-axis, and the straight line k2 is a connecting line between the multiple-antenna fixed node and the mobile terminal.

With reference to the first possible implementation manner of the sixth aspect, in a second possible implementation manner, the control unit is specifically configured to: when $0° \leq \varphi_i \leq 180°$, if $\varphi_1 < \varphi_2 < \ldots < \varphi_M$, send a first command to the mobile terminal, or if $\varphi_1 > \varphi_2 > \ldots > \varphi_M$, send a second command to the mobile terminal; or when $180° \leq \varphi_i \leq 360°$, if $\varphi_1 > \varphi_2 > \ldots > \varphi_M$, send a first command to the mobile terminal, or if $\varphi_1 < \varphi_2 < \ldots <_M$, send a second command to the mobile terminal; or when $0° \leq \varphi_i \leq 90°$ or $270° \leq \varphi_i \leq 360°$, if $\varphi_1 = \varphi_2 = \ldots = \varphi_M$ and $\theta_1 > \theta_2 > \ldots > \theta_M > 0$, send a first command to the mobile terminal, or if $\varphi_1 = \varphi_2 = \ldots = \varphi_M$ and $0 < \theta_1 < \theta_2 < \ldots < \theta_M$, send a second command to the mobile terminal; or when $90° \leq \varphi_i \leq 270°$, if $\varphi_1 = \varphi_2 = \ldots = \varphi_M$ and $0 < \theta_1 < \theta_2 < \ldots < \theta_M$, send a first command to the mobile terminal, or if $\varphi_1 = \varphi_2 = \ldots = \varphi_M$ and $\theta_1 > \theta_2 > \ldots > \theta_M > 0$, send a second command to the mobile terminal, where $\varphi_i$ is an azimuth at the $i^{th}$ moment, $\theta_i$ is an elevation angle at the $i^{th}$ moment, $1 \leq i \leq M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

With reference to the first possible implementation manner of the sixth aspect, in a third possible implementation manner, the control unit is specifically configured to: when $0° \leq \varphi_i \leq 90°$, if $\varphi_1 < \varphi_2 < \ldots < \varphi_M$, and $\theta_1 > \theta_2 > \ldots > \theta_M$, send, by the multiple-antenna node, a first command to the mobile terminal, or if $\varphi_1 > \varphi_2 > \ldots > \varphi_M$, and $\theta_1 < \theta_2 < \ldots < \theta_M$, send, by the multiple-antenna node, a second command to the mobile terminal; or when $90° \leq \varphi_i \leq 180°$, if $\varphi_1 < \varphi_2 < \ldots < \varphi_M$, and $\theta_1 < \theta_2 < \ldots < \theta_M$, send, by the multiple-antenna node, a first command to the mobile terminal, or if $\varphi_1 > \varphi_2 > \ldots > \varphi_M$, and $\theta_1 > \theta_2 > \ldots > \theta_M$, send, by the multiple-antenna node, a second command to the mobile terminal; or when $180° \leq \varphi_i \leq 270°$, if $\varphi_1 < \varphi_2 < \ldots < \varphi_M$, and $\theta_1 > \theta_2 > \ldots > \theta_M$, send, by the multiple-antenna node, a second command to the mobile terminal, or if $\varphi_1 > \varphi_2 > \ldots > \varphi_M$, and $\theta_1 < \theta_2 < \ldots < \theta_M$, send, by the multiple-antenna node, a first command to the mobile terminal; or when $270° \leq \varphi_i \leq 360°$, if $\varphi_1 < \varphi_2 < \ldots < \varphi_M$, and $\theta_1 < \theta_2 < \ldots < \theta_M$, send, by the multiple-antenna node, a second command to the mobile terminal, or if $\varphi_1 > \varphi_2 > \ldots > \varphi_M$, and $\theta_1 > \theta_2 > \ldots > \theta_M$, send, by the multiple-antenna node, a first command to the mobile terminal, where $\varphi_i$ is an azimuth at the $i^{th}$ moment, $\theta_i$ is an elevation angle at the $i^{th}$ moment, $1 \leq i \leq M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

With reference to the second or third possible implementation manner of the sixth aspect, in a fourth possible implementation manner, the first command is used to instruct: the mobile terminal to use an indoor positioning manner, or the mobile terminal to load an indoor navigation map; and the second command is used to instruct: the mobile terminal to use an outdoor positioning manner, or the mobile terminal to load an outdoor navigation map.

With reference to the second or third possible implementation manner of the sixth aspect, in a fifth possible implementation manner, the apparatus further includes a connection unit configured to before the receiving unit receives the N direction-finding signals that are respectively sent by the mobile terminal at the N moments, establish a wireless connection to the mobile terminal.

With reference to the sixth aspect or any one of the possible implementation manners of the sixth aspect, in a seventh possible implementation manner, the multiple-antenna node includes multiple-antenna Wi-Fi, or multiple-antenna BLUETOOTH.

According to a seventh aspect, a mobile terminal includes a processor; a memory; and a communications interface, where the processor, the memory and the communications interface communicate with each other by using a bus; and the processor reads program code and data stored in the memory, and executes the following operations: receiving N direction-finding signals that are respectively sent by a multiple-antenna node at N moments, where the multiple-antenna node is located in an indoor-outdoor critical area; obtaining N pieces of location relationship information between a mobile terminal and the multiple-antenna node at the N moments according to the N direction-finding signals, where the N moments and the N pieces of location relationship information are in a one-to-one correspondence; determining location relationship change information between the mobile terminal and the multiple-antenna node according to at least M of the N pieces of location relationship information, where $2 \leq M \leq N$; and controlling the mobile terminal by matching the location relationship change information and according to the location relationship change information.

In a first possible implementation manner of the seventh aspect, the obtaining N pieces of location relationship information between a mobile terminal and the multiple-antenna node at the N moments according to the N direction-finding signals includes obtaining N azimuths $\varphi$ and N elevation angles $\theta$ between the mobile terminal and the multiple-antenna node at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; $\varphi$ is an angle between a straight line k1 and a positive direction of the x-axis, and the straight line k1 is a connecting line between a projection of the mobile terminal on the ground and the original point; and $\theta$ is an angle between a straight line k2 and a negative direction of the z-axis, and the straight line k2 is a connecting line between the mobile terminal and the multiple-antenna node.

With reference to the first possible implementation manner of the seventh aspect, in a second possible implementation manner, the controlling the mobile terminal by matching the location relationship change information and according to the location relationship change information includes when $0° \leq \varphi_i \leq 180°$, if $\varphi_1 < \varphi_2 < \ldots < \varphi_M$, controlling the mobile terminal in a first manner, or if $\varphi_1 > \varphi_2 > \ldots > \varphi_M$, controlling the mobile terminal in a second manner; or when $180° \leq \varphi_i \leq 360°$, if $\varphi_1 > \varphi_2 > \ldots > \varphi_M$, controlling the mobile terminal in a first manner, or if $\varphi_1 < \varphi_2 < \ldots < \varphi_M$, controlling the mobile terminal in a second manner; or when $0° \leq \varphi_i \leq 90°$ or $270° \leq q \varphi_i \leq 360°$, if $\varphi_1 = \varphi_2 = \ldots = \varphi_M$ and $\theta_1 > \theta_2 > \ldots > \theta_M > 0$, controlling the mobile terminal in a first manner, or if $\varphi_1 = \varphi_2 = \ldots = \varphi_M$ and $0 < \theta_1 < \theta_2 < \ldots < \theta_M$, controlling the mobile terminal in a second manner; or when $90° \leq \varphi_i \leq 270°$, if $\varphi_1 = \varphi_2 = \ldots = \varphi_M$ and $0 < \theta_1 < \theta_2 < \ldots < \theta_M$, controlling the mobile terminal in a first manner, or if $\varphi_1 = \varphi_2 = \ldots = \varphi_M$ and $\theta_1 > \theta_2 > \ldots > \theta_M > 0$, controlling the mobile terminal in a second manner, where $\varphi_i$ is an azimuth at the $i^{th}$ moment, $\theta_i$ is an elevation angle at the $i^{th}$ moment, $1 \leq i \leq M$, the first manner matches a movement trend of the mobile terminal moving from outdoors to indoors, and the second manner matches a movement trend of the mobile terminal moving from indoors to outdoors.

With reference to the first possible implementation manner of the seventh aspect, in a third possible implementation manner, the controlling the mobile terminal by matching the location relationship change information and according to the location relationship change information includes when $0°\leq \varphi_i \leq 90°$, if $\varphi_1<\varphi_2< \ldots <\varphi_M$, and $\theta_1>\theta_2> \ldots >\theta_M$, controlling the mobile terminal in a first manner, or if $\varphi_1>\varphi_2> \ldots >\varphi_M$, and $\theta_1<\theta_2< \ldots <\theta_M$, controlling the mobile terminal in a second manner; or when $90°\leq \varphi_i \leq 180°$, if $\varphi_1<\varphi_2< \ldots <\varphi_M$, and $\theta_1<\theta_2< \ldots <\theta_M$, controlling the mobile terminal in a first manner, or if $\varphi_1>\varphi_2> \ldots >\varphi_M$, and $\theta_1>\theta_2> \ldots >\theta_M$, controlling the mobile terminal in a second manner; or when $180°\leq \varphi_i \leq 270°$, if $\varphi_1<\varphi_2< \ldots <\varphi_M$, and $\theta_1>\theta_2> \ldots >\theta_M$, controlling the mobile terminal in a second manner, or if $\varphi_1>\varphi_2> \ldots >\varphi_M$, and $\theta_1<\theta_2< \ldots <\theta_M$, controlling the mobile terminal in a first manner; or when $270°\leq \varphi_i \leq 360°$, if $\varphi_1<\varphi_2< \ldots <\varphi_M$, and $\theta_1<\theta_2< \ldots <\theta_M$, controlling the mobile terminal in a second manner, or if $\varphi_1>\varphi_2> \ldots >\varphi_M$, and $\theta_1>\theta_2> \ldots >\theta_M$, controlling the mobile terminal in a first manner, where $\varphi_i$ is an azimuth at the $i^{th}$ moment, $\theta_i$ is an elevation angle at the $i^{th}$ moment, $1 \leq i \leq M$, the first manner matches a movement trend of the mobile terminal moving from outdoors to indoors, and the second manner matches a movement trend of the mobile terminal moving from indoors to outdoors.

With reference to the second or third possible implementation manner of the seventh aspect, in a fourth possible implementation manner, the controlling the mobile terminal in a first manner includes controlling the mobile terminal to use an indoor positioning manner, or controlling the mobile terminal to load an indoor navigation map; and the controlling the mobile terminal in a second manner includes controlling the mobile terminal to use an outdoor positioning manner, or controlling the mobile terminal to load an outdoor navigation map.

With reference to the seventh aspect or any one of the possible implementation manners of the seventh aspect, in a fifth possible implementation manner, before receiving the N direction-finding signals that are respectively sent by the mobile terminal at the N moments, the processor further executes: when a quantity of visible satellites received by the mobile terminal is less than or equal to a first threshold, establishing a wireless connection to the multiple-antenna node; or when strength of a Wi-Fi signal detected by the mobile terminal is greater than or equal to a second threshold, establishing a wireless connection to the multiple-antenna node; or when strength of a Wi-Fi signal detected by the mobile terminal is less than or equal to a third threshold, establishing a wireless connection to the multiple-antenna node; or when a quantity of Wi-Fi access points or a quantity of BLUETOOTH nodes detected by the mobile terminal is greater than or equal to a fourth threshold, establishing a wireless connection to the multiple-antenna node; or when a quantity of Wi-Fi access points or a quantity of BLUETOOTH nodes detected by the mobile terminal is less than or equal to a fifth threshold, establishing a wireless connection to the multiple-antenna node.

With reference to the fourth possible implementation manner of the seventh aspect, in a sixth possible implementation manner, the indoor positioning manner includes Wi-Fi positioning, BLUETOOTH positioning, magnetic field positioning or light ray positioning.

With reference to the fourth possible implementation manner of the seventh aspect, in a seventh possible implementation manner, the outdoor positioning manner includes GNSS positioning, cellular network positioning or Wi-Fi positioning.

According to an eighth aspect, a mobile terminal includes a processor; a memory; and a communications interface, where the processor, the memory and the communications interface communicate with each other by using a bus; and the processor reads program code and data stored in the memory, and executes the following operations: respectively sending N direction-finding signals at N moments to a multiple-antenna node located in an indoor-outdoor critical area; receiving a control command that is returned by the multiple-antenna node according to the N direction-finding signals; and executing the control command.

In a first possible implementation manner of the eighth aspect, the control command includes a first command matching a movement trend of the mobile terminal moving from outdoors to indoors; or a second command matching a movement trend of the mobile terminal moving from indoors to outdoors.

With reference to the first possible implementation manner of the eighth aspect, in a second possible implementation manner, the control command is the first command, and the executing, by the processor, the control command includes using an indoor positioning manner; or loading an indoor navigation map.

With reference to the first possible implementation manner of the eighth aspect, in a third possible implementation manner, the control command is the second command, and the executing, by the processor, the control command includes using an outdoor positioning manner; or loading an outdoor navigation map.

According to a ninth aspect, a multiple-antenna node, the multiple-antenna node is located in an indoor-outdoor critical area, and the multiple-antenna node includes a processor; a memory; and a communications interface, where the processor, the memory and the communications interface communicate with each other by using a bus; and the processor reads program code and data stored in the memory, and executes the following operations: receiving N direction-finding signals that are respectively sent by a mobile terminal at N moments; obtaining N pieces of location relationship information between the multiple-antenna node and the mobile terminal at the N moments according to the N direction-finding signals, where the N moments and the N pieces of location relationship information are in a one-to-one correspondence; determining location relationship change information between the multiple-antenna node and the mobile terminal according to at least M of the N pieces of location relationship information, where $2 \leq M \leq N$; and sending a control command matching the location relationship change information to the mobile terminal according to the location relationship change information.

In a first possible implementation manner of the ninth aspect, the obtaining N pieces of location relationship information between the multiple-antenna node and the mobile terminal at the N moments according to the N direction-finding signals includes obtaining N azimuths $\varphi$ and N elevation angles $\theta$ between the multiple-antenna node and the mobile terminal at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, and the straight line k1 is a connecting line between a projection of the mobile terminal on the ground and the original point; and θ is an angle between a straight line k2 and a negative direction of the z-axis, and the straight line k2 is a connecting line between the multiple-antenna node and the mobile terminal.

With reference to the first possible implementation manner of the ninth aspect, in a second possible implementation manner, the sending, by matching the location relationship change information and according to the location relationship change information, a command for controlling the mobile terminal includes when $0°≤φ_i≤180°$, if $φ_1<φ_2<\ldots<φ_M$, sending a first command to the mobile terminal, or if $φ_1>φ_2>\ldots>φ_M$, sending a second command to the mobile terminal; or when $180°≤φ_i≤360°$, if $φ_1>φ_2>\ldots>φ_M$, sending a first command to the mobile terminal, or if $φ_1<φ_2<\ldots<φ_M$, sending a second command to the mobile terminal; or when $0°≤φ_i≤90°$ or $270°≤φ_i≤360°$, if $φ_1=φ_2=\ldots=φ_M$ and $θ_1>θ_2>\ldots>θ_M>0$, sending a first command to the mobile terminal, or if $φ_1=φ_2=\ldots=φ_M$ and $0<θ_1<θ_2<\ldots<θ_M$, sending a second command to the mobile terminal; or when $90°≤φ_i≤270°$, if $φ_1=φ_2=\ldots=φ_M$ and $0<θ_1<θ_2<\ldots<θ_M$, sending a first command to the mobile terminal, or if $φ_1=φ_2=\ldots=φ_M$ and $θ_1>θ_2>\ldots>θ_M>0$, sending a second command to the mobile terminal, where $φ_i$ is an azimuth at the $i^{th}$ moment, $θ_i$ is an elevation angle at the $i^{th}$ moment, $1≤i≤M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

With reference to the first possible implementation manner of the ninth aspect, in a third possible implementation manner, the sending, by matching the location relationship change information and according to the location relationship change information, a command for controlling the mobile terminal includes when $0°≤φ_i≤90°$, if $φ_1<φ_2<\ldots<φ_M$, and $θ_1>θ_2>\ldots>θ_M$, sending a first command to the mobile terminal, or if $φ_1>φ_2>\ldots>φ_M$, and $θ_1<θ_2<\ldots<θ_M$, sending a second command to the mobile terminal; or when $90°≤φ_i≤180°$, if $φ_1<φ_2<\ldots<φ_M$, and $θ_1<θ_2<\ldots<θ_M$, sending a first command to the mobile terminal, or if $φ_1>φ_2>\ldots>φ_M$, and $θ_1>θ_2>\ldots>θ_M$, sending a second command to the mobile terminal; or when $180°≤φ_i≤270°$, if $φ_1<φ_2<\ldots<φ_M$, and $θ_1>θ_2>\ldots>θ_M$, sending a second command to the mobile terminal, or if $φ_1>φ_2>\ldots>φ_M$, and $θ_1<θ_2<\ldots<θ_M$, sending a first command to the mobile terminal; or when $270°≤φ_i≤360°$, if $φ_1<φ_2<\ldots<φ_M$, and $θ_1<θ_2<\ldots<θ_M$, sending a second command to the mobile terminal, or if $φ_1>φ_2>\ldots>φ_M$, and $θ_1>θ_2>\ldots>θ_M$, sending a first command to the mobile terminal, where $φ_i$ is an azimuth at the $i^{th}$ moment, $θ_i$ is an elevation angle at the $i^{th}$ moment, $1≤i≤M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

With reference to the second or third possible implementation manner of the ninth aspect, in a fourth possible implementation manner, the first command is used to instruct the mobile terminal to use an indoor positioning manner; or the first command is used to instruct the mobile terminal to load an indoor navigation map; and the second command is used to instruct the mobile terminal to use an outdoor positioning manner; or the second command is used to instruct the mobile terminal to load an outdoor navigation map.

With reference to the ninth aspect or any one of the possible implementation manners of the ninth aspect, in a fifth possible implementation manner, before receiving the N direction-finding signals that are respectively sent by the mobile terminal at the N moments, the processor further executes establishing a wireless connection between the multiple-antenna node and the mobile terminal.

With reference to the ninth aspect or any one of the possible implementation manners of the ninth aspect, in a sixth possible implementation manner, the multiple-antenna node includes a multiple-antenna Wi-Fi node, or a multiple-antenna BLUETOOTH node.

According to a tenth aspect, a control system includes any mobile terminal control apparatus according to the fourth aspect and a multiple-antenna node control apparatus, where the multiple-antenna node control apparatus is configured to respectively send N direction-finding signals to a mobile terminal at N moments.

According to an eleventh aspect, a control system includes any mobile terminal according to the seventh aspect and a multiple-antenna node, where the multiple-antenna node includes a transceiver configured to respectively send N direction-finding signals to the mobile terminal at N moments.

According to a twelfth aspect, a control system includes any mobile terminal control apparatus according to the fifth aspect and any multiple-antenna node control apparatus according to the sixth aspect.

According to a thirteenth aspect, a control system includes any mobile terminal according to the eighth aspect and any multiple-antenna node according to the ninth aspect.

According to the embodiments of the disclosure, location relationship change information between a mobile terminal and a multiple-antenna node may be obtained in a period of time according to multiple direction-finding signals, and then the mobile terminal is controlled by matching the change information and according to the location relationship change information. Because the location relationship change information may accurately denote a movement trend of the mobile terminal moving from indoors to outdoors or a movement trend of the mobile terminal moving from outdoors to indoors, the mobile terminal may be controlled based on the accurate movement trend.

DESCRIPTION OF EMBODIMENTS

The following clearly describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the present invention.

When terms of ordinal numbers such as "first" and "second" are mentioned in the embodiments of the disclosure, unless actually expressing an order meaning according to a context, the terms should be understood as only playing a role of distinguishing.

Figure 1:
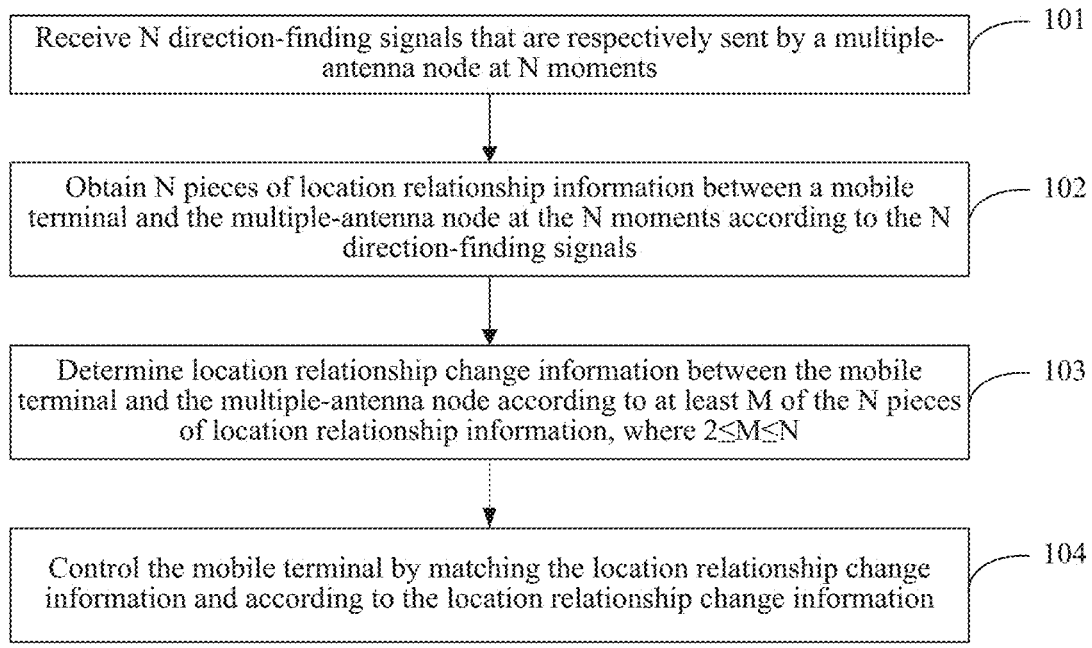
FIG. 1 is a flowchart of a mobile terminal control method according to an embodiment of the disclosure.

FIG. 1 is a flowchart of a mobile terminal control method according to an embodiment of the disclosure. As shown in FIG. 1, the method includes the following steps.

Step 101: Receive N direction-finding signals that are respectively sent by a multiple-antenna node at N moments, where the multiple-antenna node is located in an indoor-outdoor critical area.

Figure 2:
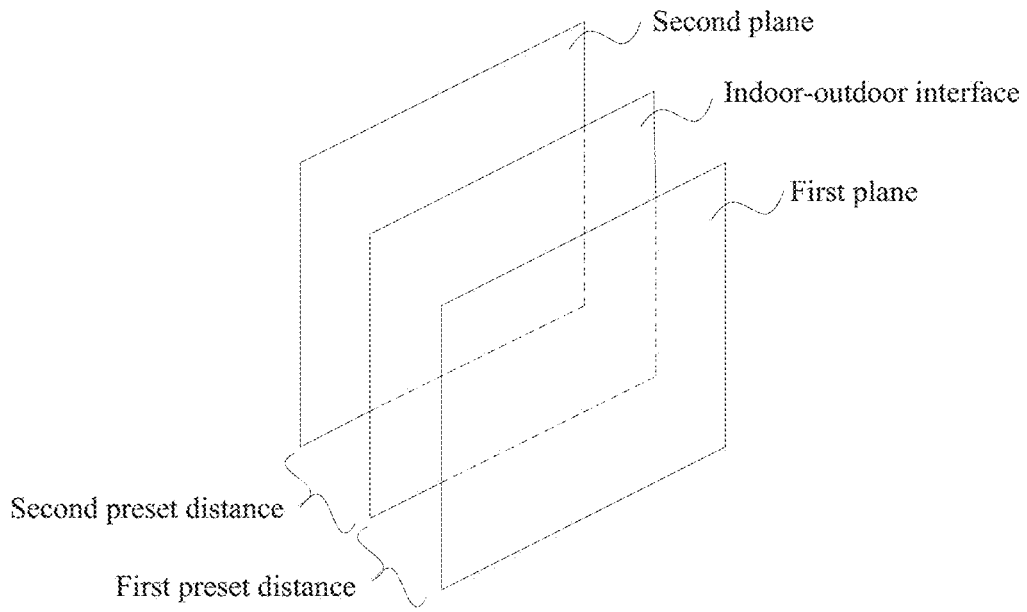
FIG. 2 is a schematic diagram of an indoor-outdoor critical area according to an embodiment of the disclosure.

An indoor-outdoor interface is generally defined by using a wall, a door, or a window. Being within a wall, a door or a window is being indoor, being beyond a wall, a door or a window is being outdoor, and the wall, the door or the window may be referred to as an indoor-outdoor interface. An indoor-outdoor critical area is a space area that is nearby the indoor-outdoor interface and that includes the indoor-outdoor interface. FIG. 2 is a schematic diagram of an indoor-outdoor critical area according to an embodiment of the disclosure. As shown in FIG. 2, a first plane is parallel to an indoor-outdoor interface and is at a first preset distance from the indoor-outdoor interface, a second plane is parallel to the indoor-outdoor interface and is at a second preset distance from the indoor-outdoor interface, and space between the first plane and the second plane belongs to an indoor-outdoor critical area. The first preset distance or the second preset distance may be preset according to requirements, for example, may be 5 meters, 8 meters or 10 meters, and the first preset distance and the second preset distance may be equal or unequal.

Figure 3:
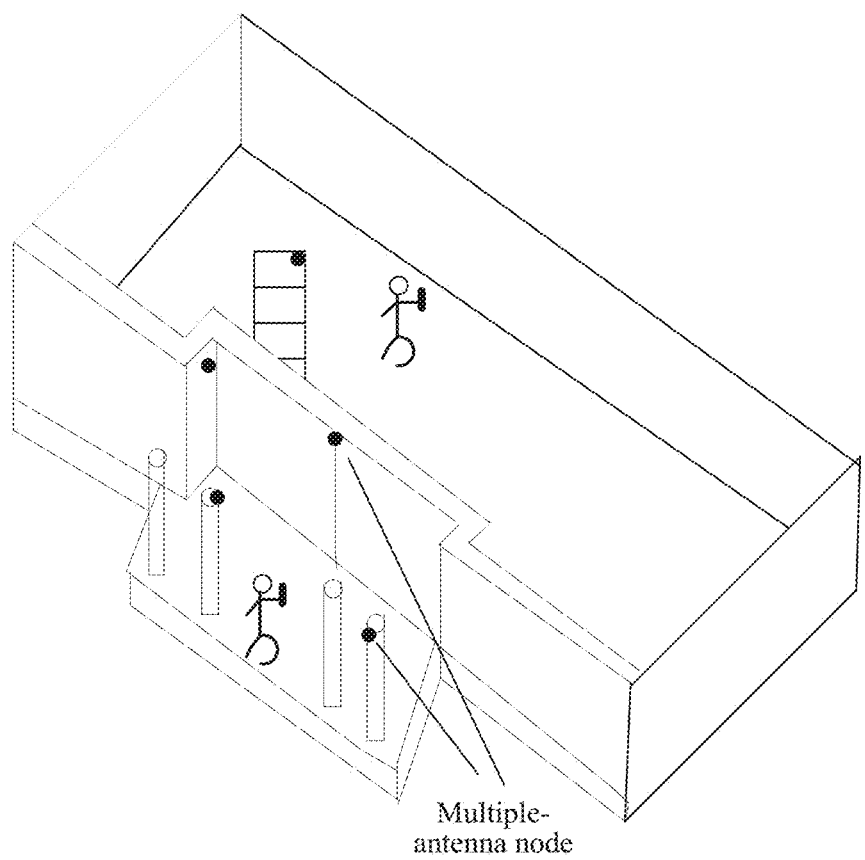
FIG. 3 is a schematic diagram of an application scenario according to an embodiment of the disclosure.

FIG. 3 is a schematic diagram of an application scenario according to an embodiment of the disclosure. As shown in FIG. 3, an indoor-outdoor interface is a front door of a shopping mall, a space range that is beyond the front door and within the front door, and that is at a distance from the front door may be referred to as an indoor-outdoor critical area. A size of the indoor-outdoor critical area may be set according to an actual situation. For example, a pillar beyond the door, the front door, a cabinet within the door are all located within the indoor-outdoor critical area. A multiple-antenna node of this embodiment of the disclosure is located in the indoor-outdoor critical area, and the multiple-antenna node may be disposed on any building located within the indoor-outdoor critical area as shown in FIG. 3, the multiple-antenna node may be located on the pillar beyond the door, above the front door or on the cabinet within the door.

Figure 4:
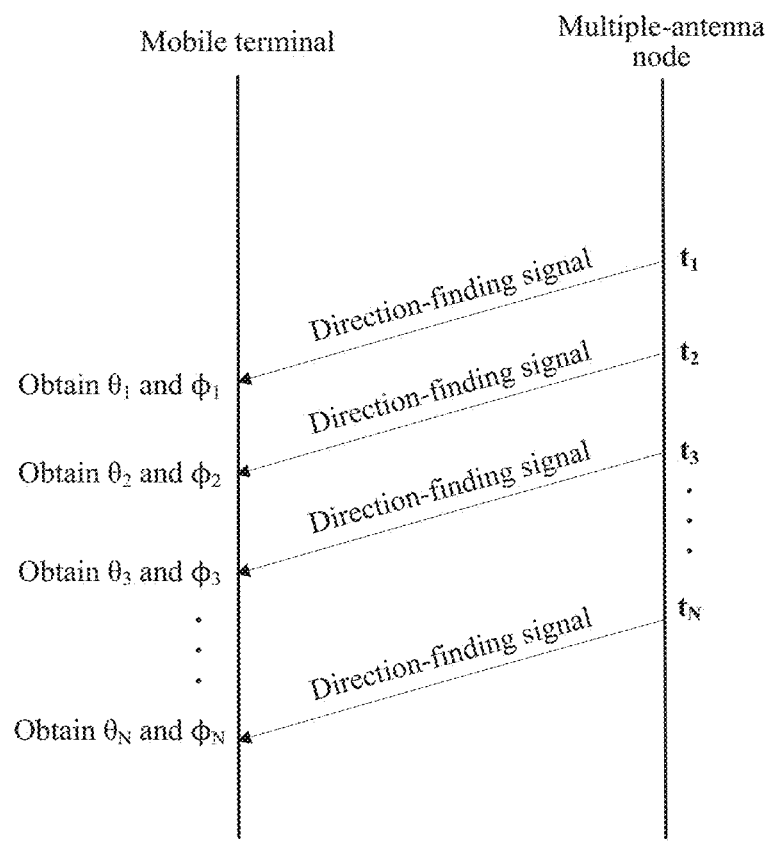
FIG. 4 is a schematic diagram of receiving/transmitting a signal between a mobile terminal and a multiple-antenna node according to an embodiment of the disclosure.

FIG. 4 is a schematic diagram of receiving/transmitting a signal between a mobile terminal and a multiple-antenna node according to an embodiment of the disclosure. As shown in FIG. 4, the multiple-antenna node respectively sends N direction-finding signals at N moments $t_1, t_2, \ldots,$ and $t_N$, and the N moments may be, for example, N moments with fixed time intervals, or N moments with changeable time intervals. The mobile terminal may receive, according to a direction-finding signal sending sequence, the N direction-finding signals that are respectively sent by the multiple-antenna node at the N moments.

It should be noted that, the multiple-antenna node has multiple antennas configured to receive/transmit a signal, and may be, for example, a multiple-antenna Wi-Fi node or a multiple-antenna BLUETOOTH node. The multiple-antenna node may be in a signal receiving/transmitting state, and when the mobile terminal enters signal coverage of the multiple-antenna node, the mobile terminal may receive a direction-finding signal sent by the multiple-antenna node.

Step 102: Obtain N pieces of location relationship information between a mobile terminal and the multiple-antenna node at the N moments according to the N direction-finding signals, where the N moments and the N pieces of location relationship information are in a one-to-one correspondence.

Specifically, location relationship information between the mobile terminal and the multiple-antenna node is, for example, an azimuth $\varphi$ and an elevation angle $\theta$. After receiving a direction-finding signal sent by the multiple-antenna node, the mobile terminal may calculate an azimuth $\varphi$ and an elevation angle $\theta$ between the mobile terminal and the multiple-antenna node by using, for example, a 2 dimensional Multiple Signal Classification (2D MUSIC) algorithm, a 2D forward/backward spatial smoothing multiple signal classification (2D FBSS) algorithm, a 2D FBSS based direction of arrival matrix (2D FBSS-DOAM) algorithm or a 2D Estimation of signal parameters by rotational invariance techniques (ESPRIT) algorithm, and information about the azimuth $\varphi$ and the elevation angle $\theta$ between the mobile terminal and the multiple-antenna node is location relationship information between the mobile terminal and the multiple-antenna node. The algorithm may be implemented by using software and by embedding code in the mobile terminal, or may be further implemented by using a chip having the calculation function.

The mobile terminal obtains N azimuths $\varphi$ and N elevation angles $\theta$ between the mobile terminal and the multiple-antenna node at the N moments according to the N direction-finding signals sent by the multiple-antenna node. That is, when obtaining $\varphi$ and $\theta$ at the N moments, the mobile terminal obtains N pieces of location relationship information between the mobile terminal and the multiple-antenna node at the N moments, and the N moments and the N pieces of location relationship information are in a one-to-one correspondence, where $N \geq 2$.

Figure 5:
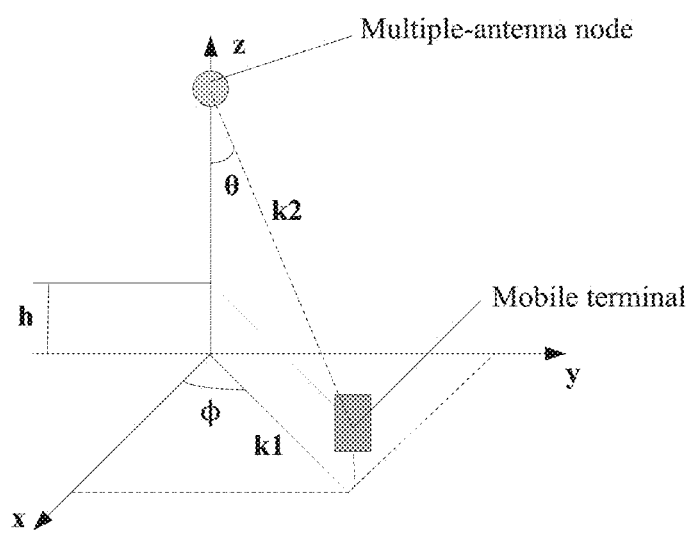
FIG. 5 is a schematic diagram of determining a coordinate system of an azimuth and an elevation angle according to an embodiment of the disclosure.

FIG. 5 is a schematic diagram of determining a coordinate system of an azimuth and an elevation angle according to an embodiment of the disclosure. As shown in FIG. 5, determining of a coordinate system of φ and θ may be set in the following manner: a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, the straight line k1 is a connecting line between a projection of the mobile terminal on the ground and the original point, and a distance from the mobile terminal to the ground is h; and θ is an angle between a straight line k2 and a negative direction of the z-axis, and the straight line k2 is a connecting line between the mobile terminal and the multiple-antenna node, where x, y, and z are only for convenience of labeling, names of x, y, and z may be replaced with other letters, as long as physical space locations of φ and θ are unchanged.

Step 103: Determine location relationship change information between the mobile terminal and the multiple-antenna node according to at least M of the N pieces of location relationship information, where 2≤M≤N.

If the mobile terminal moves, for example, moves from indoors to outdoors, or moves from outdoors to indoors, because the N moments and the N pieces of location relationship information are in a one-to-one correspondence, location relationships between the mobile terminal and the multiple-antenna node obtained at the N moments are changeable. The mobile terminal may obtain location relationship change information between the mobile terminal and the multiple-antenna node according to the location relationship information between the mobile terminal and the multiple-antenna node obtained at the N moments. The location relationship change information denotes information about changes of an azimuth and an elevation angle of the mobile terminal relative to the multiple-antenna node, and is used to denote a movement trend of the mobile terminal, that is, whether the mobile terminal moves from outdoors to indoors, or moves from indoors to outdoors.

For example, when the N pieces of location relationship information obtained at the N moments are $\varphi_1, \varphi_2, \ldots,$ and $\varphi_N$ and $\theta_1, \theta_2, \ldots,$ and $\theta_N$, the location relationship change information between the mobile terminal and the multiple-antenna node may be determined according to the N pieces of location relationship information, or the location relationship change information between the mobile terminal and the multiple-antenna node may be determined by selecting M of the N pieces of location relationship information, and the M pieces of location relationship information may be several continuously selected pieces of location relationship information of the N pieces of location relationship information, or may be several pieces of location relationship information that are selected at intervals, where 2≤M≤N.

Step 104: Control the mobile terminal by matching the location relationship change information and according to the location relationship change information.

How the mobile terminal selects, according to the location relationship change information, a control manner matching the location relationship change information to control an operation of the mobile terminal is described below with reference to FIG. 5.

For example, when $0°≤\varphi_i≤180°$, if an azimuth between the mobile terminal and the multiple-antenna node gradually increases, that is, the location relationship change information is $\varphi_1<\varphi_2<\ldots<\varphi_M$, it indicates that a movement trend of the mobile terminal is moving from outdoors to indoors, and then the mobile terminal is controlled in a first manner corresponding to this movement trend; or if an azimuth between the mobile terminal and the multiple-antenna node gradually decreases, that is, the location relationship change information is $\varphi_1>\varphi_2>\ldots>\varphi_M$, it indicates that a movement trend of the mobile terminal is moving from indoors to outdoors, and then the mobile terminal is controlled in a second manner corresponding to this movement trend, where $\varphi_i$ is an azimuth at the $i^{th}$ moment, and 1≤i≤M.

When $180°≤\varphi_i≤360°$, if an azimuth between the mobile terminal and the multiple-antenna node gradually decreases, that is, the location relationship change information is $\varphi_1>\varphi_2>\ldots>\varphi_M$, it indicates that a movement trend of the mobile terminal is moving from outdoors to indoors, and then the mobile terminal is controlled in a first manner corresponding to this movement trend; or if an azimuth between the mobile terminal and the multiple-antenna node gradually increases, that is, the location relationship change information is $\varphi_1<\varphi_2<\ldots<\varphi_M$, it indicates that a movement trend of the mobile terminal is moving from indoors to outdoors, and then the mobile terminal is controlled in a second manner corresponding to this movement trend, where $\varphi_i$ is an azimuth at the $i^{th}$ moment, and 1≤i≤M.

When $0°≤\varphi_i≤90°$ or $270°≤\varphi_i≤3600$, if an azimuth between the mobile terminal and the multiple-antenna node is unchanged and an elevation angle between the mobile terminal and the multiple-antenna node gradually decreases, that is, the location relationship change information is $\varphi_1=\varphi_2=\ldots=\varphi_M$ and $\theta_1>\theta_2>\ldots>\theta_M>0$, it indicates that a movement trend of the mobile terminal is moving from outdoors to indoors, and then the mobile terminal is controlled in a first manner corresponding to this movement trend; or if an azimuth between the mobile terminal and the multiple-antenna node is unchanged and an elevation angle between the mobile terminal and the multiple-antenna node gradually increases, that is, the location relationship change information is $\varphi_1=\varphi_2=\ldots=\varphi_M$ and $0<\theta_1<\theta_2<\ldots<\theta_M$, it indicates that a movement trend of the mobile terminal is moving from indoors to outdoors, and then the mobile terminal is controlled in a second manner corresponding to this movement trend, where $\varphi_i$ is an azimuth at the $i^{th}$ moment, $\theta_i$ is an elevation angle at the $i^{th}$ moment, and 1≤i≤M.

When $90°≤\varphi_i≤270°$, if an azimuth between the mobile terminal and the multiple-antenna node is unchanged and an elevation angle between the mobile terminal and the multiple-antenna node gradually increases, that is, the location relationship change information is $\varphi_1=\varphi_2=\ldots=\varphi_M$ and $0<\theta_1<\theta_2<\ldots<\theta_M$, it indicates that a movement trend of the mobile terminal is moving from outdoors to indoors, and then the mobile terminal is controlled in a first manner corresponding to this movement trend; or if an azimuth between the mobile terminal and the multiple-antenna node is unchanged and an elevation angle between the mobile terminal and the multiple-antenna node gradually decreases, that is, the location relationship change information is $\varphi_1=\varphi_2=\ldots=\varphi_M$ and $\theta_1>\theta_2>\ldots>\theta_M>0$, it indicates that a movement trend of the mobile terminal is moving from indoors to outdoors, and then the mobile terminal is controlled in a second manner corresponding to this movement trend, where $\varphi_i$ is an azimuth at the $i^{th}$ moment, $\theta_i$ is an elevation angle at the $i^{th}$ moment, and 1≤i≤M.

Optionally, to more accurately determine the movement trend of the mobile terminal, the operation of the mobile terminal may be further controlled based on any one of the following four conditions and by selecting a control manner matching the location relationship change information according to the location relationship change information.

First condition: when $0° \leq \varphi_i \leq 90°$, if an azimuth between the mobile terminal and the multiple-antenna node gradually increases and an elevation angle between the mobile terminal and the multiple-antenna node gradually decreases, that is, the location relationship change information is $\varphi_1 < \varphi_2 < \ldots < \varphi_M$, and $\theta_1 > \theta_2 > \ldots > \theta_M$, it indicates that a movement trend of the mobile terminal is moving from outdoors to indoors, and then the mobile terminal is controlled in a first manner corresponding to this movement trend; or if an azimuth between the mobile terminal and the multiple-antenna node gradually decreases and an elevation angle between the mobile terminal and the multiple-antenna node gradually increase, that is, the location relationship change information is $\varphi_1 > \varphi_2 > \ldots > \varphi_M$, and $\theta_1 < \theta_2 < \ldots < \theta_M$, it indicates that a movement trend of the mobile terminal is moving from indoors to outdoors, and then the mobile terminal is controlled in a second manner corresponding to this movement trend.

Second condition: when $90° \leq \varphi_i \leq 180°$, if an azimuth between the mobile terminal and the multiple-antenna node gradually increases and an elevation angle between the mobile terminal and the multiple-antenna node gradually increases, that is, the location relationship change information is $\varphi_1 < \varphi_2 < \ldots < \varphi_M$, and $\theta_1 < \theta_2 < \ldots < \theta_M$, it indicates that a movement trend of the mobile terminal is moving from outdoors to indoors, and then the mobile terminal is controlled in a first manner corresponding to this movement trend; or if an azimuth between the mobile terminal and the multiple-antenna node gradually decreases and an elevation angle between the mobile terminal and the multiple-antenna node gradually decreases, that is, the location relationship change information is $\varphi_1 > \varphi_2 > \ldots > \varphi_M$, and $\theta_1 > \theta_2 > \ldots > \theta_M$, it indicates that a movement trend of the mobile terminal is moving from indoors to outdoors, and then the mobile terminal is controlled in a second manner corresponding to this movement trend.

Third condition: when $180° \leq \varphi_i \leq 270°$, if an azimuth between the mobile terminal and the multiple-antenna node gradually increases and an elevation angle between the mobile terminal and the multiple-antenna node gradually decreases, that is, the location relationship change information is $\varphi_1 < \varphi_2 < \ldots < \varphi_M$, and $\theta_1 > \theta_2 > \ldots > \theta_M$, it indicates that a movement trend of the mobile terminal is moving from indoors to outdoors, and then the mobile terminal is controlled in a second manner corresponding to this movement trend; or if an azimuth between the mobile terminal and the multiple-antenna node gradually decreases and an elevation angle between the mobile terminal and the multiple-antenna node gradually increase, that is, the location relationship change information is $\varphi_1 > \varphi_2 > \ldots > \varphi_M$, and $\theta_1 < \theta_2 < \ldots < \theta_M$, it indicates that a movement trend of the mobile terminal is moving from outdoors to indoors, and then the mobile terminal is controlled in a first manner corresponding to this movement trend.

Fourth condition: when $270° \leq \varphi_i \leq 360°$, if an azimuth between the mobile terminal and the multiple-antenna node gradually increases and an elevation angle between the mobile terminal and the multiple-antenna node gradually increases, that is, the location relationship change information is $\varphi_1 < \varphi_2 < \ldots < \varphi_M$, and $\theta_1 < \theta_2 < \ldots < \theta_M$, it indicates that a movement trend of the mobile terminal is moving from indoors to outdoors, and then the mobile terminal is controlled in a second manner corresponding to this movement trend; or if an azimuth between the mobile terminal and the multiple-antenna node gradually decreases and an elevation angle between the mobile terminal and the multiple-antenna node gradually decreases, that is, the location relationship change information is $\varphi_1 > \varphi_2 > \ldots > \varphi_M$, and $\theta_1 > \theta_2 > \ldots > \theta_M$, it indicates that a movement trend of the mobile terminal is moving from outdoors to indoors, and then the mobile terminal is controlled in a first manner corresponding to this movement trend.

In the foregoing four conditions, $\varphi_i$ is an azimuth at the $i^{th}$ moment, and $\theta_i$ is an elevation angle at the $i^{th}$ moment, where $1 \leq i \leq M$.

It should be noted that, in this embodiment of the disclosure, N pieces of location relationship information between the mobile terminal and the multiple-antenna node at N moments are obtained, but different time points may be selected to start an action of controlling the mobile terminal. For example, a preset time length is set, a quantity of obtained location relationships is set, and specific location relationship information is set.

Details are as follows.

For example, a preset time length is set, that is, starting from obtaining first location relationship information of a first location relationship between the mobile terminal and the multiple-antenna node, and ending with the preset time length, location relationship change information between the mobile terminal and the multiple-antenna node is determined according to location relationship information obtained in the preset time length, and then an action of controlling the mobile terminal is executed. The preset time length may be 1 second, 2 seconds or 5 seconds, and the preset time length may be set, for example, according to an environment in which the mobile terminal is located or a parameter of the multiple-antenna node. The preset time length may be averagely allocated to select N moments, or N moments may be randomly selected, to obtain N pieces of location relationship information. In specific implementation, a time window may be fixed, and an action of the mobile terminal is controlled according to obtained location relationship information in each time window.

For example, a quantity of obtained location relationships is preset, that is, starting from obtaining first location relationship information of a first location relationship between the mobile terminal and the multiple-antenna node, and ending with reaching a first preset location relationship quantity, for example, N, an action of controlling the mobile terminal is executed. Alternatively, starting from obtaining first location relationship information of a first location relationship between the mobile terminal and the multiple-antenna node, and ending with reaching a second preset location relationship quantity, for example, M, an action of controlling the mobile terminal is executed.

For example, specific location relationship information is set, that is, when obtained location relationship information between the mobile terminal and the multiple-antenna node indicates that the mobile terminal crosses a boundary of an indoor-outdoor critical area, for example, an azimuth changes from 0° to 90° to 90° to 180°, it indicates that the mobile terminal is already indoor from being outdoor, and an action of controlling the mobile terminal is executed.

In this embodiment of the disclosure, the controlling, by the mobile terminal, the mobile terminal in the first manner may, for example, include controlling the mobile terminal to use an indoor positioning manner, or controlling the mobile terminal to load an indoor navigation map.

For example, when the location relationship change information between the mobile terminal and the multiple-antenna node indicates that the movement trend of the mobile terminal is moving from outdoors to indoors, the mobile terminal is controlled corresponding to this movement trend to use an indoor positioning manner or load an indoor navigation map, thereby matching the indoor positioning manner.

The indoor positioning manner is, for example, Wi-Fi positioning, BLUETOOTH positioning, magnetic field positioning or light ray positioning.

It should be noted that, in this embodiment of the disclosure, the controlling, by the mobile terminal, the mobile terminal in the second manner may, for example, include controlling the mobile terminal to use an outdoor positioning manner, or controlling the mobile terminal to load an outdoor navigation map.

For example, when the location relationship change information between the mobile terminal and the multiple-antenna node indicates that the movement trend of the mobile terminal is moving from indoors to outdoors, the mobile terminal is controlled corresponding to this movement trend to use an outdoor positioning manner or load an outdoor navigation map, thereby matching the outdoor positioning manner.

The outdoor positioning manner includes GNSS positioning, cellular network positioning, or Wi-Fi positioning.

For example, the Wi-Fi positioning may be: multiple Wi-Fi hotspots transmit signals to surroundings, the mobile terminal detects signal strength of each hotspot, and sends information about the detected signal strength to a server, and the server queries, according to the information, coordinates of each hotspot that are recorded in a database, and performs calculation, thereby positioning the mobile terminal.

For example, the BLUETOOTH positioning may be: BLUETOOTH transmits signals to surroundings, and the mobile terminal provided with a BLUETOOTH module identifies an ID of the mobile terminal by receiving these BLUETOOTH signals, and determines a location of the mobile terminal.

The magnetic field positioning refers to: a magnetic field map is constructed, and an indoor location of the mobile terminal is determined according to a fluctuation situation of a surrounding magnetic field.

The light ray positioning may include infrared light or visible light positioning, for example, white light LED positioning, which positions the mobile terminal by using a high-speed flicking signal that is invisible to a naked eye and that is sent by LED lamplight.

The GNSS positioning generally refers to all positioning implemented by using a satellite navigation system.

The cellular network positioning refers to positioning performed on the mobile terminal by using a base station signal.

The foregoing various positioning manners all belong to the prior art, and details are not described herein.

How to control a mobile terminal is described below by using an example.

For example, the mobile terminal is located outdoors, an outdoor positioning unit (using a global positioning system (GPS) in a GNSS as an example) GPS is positioning the mobile terminal, and when by using the method of this embodiment of the disclosure, the mobile terminal obtains location relationship change information between the mobile terminal and a multiple-antenna node, and the change information indicates that the mobile terminal is moving from outdoors to indoors, for example, when $0°≤φi≤180°$, and a change of an azimuth between the mobile terminal and the multiple-antenna node is $φ_1<φ_2<\ldots<φ_M$, an indoor positioning unit in the mobile terminal is used, for example, Wi-Fi or BLUETOOTH. The mobile terminal may preset a use priority of each indoor positioning unit, so as to preferably select an indoor positioning unit with a highest priority during use of the indoor positioning units; or when the indoor positioning units are used, and meanwhile multiple indoor positioning units are enabled, a positioning unit that is used to implement indoor positioning depends on signal strength of each indoor positioning unit. During use of the indoor positioning unit, the outdoor positioning unit may be disabled, or an outdoor positioning unit may be kept in an enabled state. If the outdoor positioning unit is disabled, a positioning result of the indoor positioning unit is directly used as a criterion; or if the enabled state of the outdoor positioning unit is kept, positioning results of the indoor and outdoor positioning units may be compared. If the indoor and outdoor positioning units are at a close distance, weighted superposition is performed on the results of the indoor and outdoor positioning units, and a result obtained through the weighted superposition is used as output, or if the indoor and outdoor positioning units are at a far distance, a newly started system is directly used as a criterion. How to control a status of the outdoor positioning unit may be set in the mobile terminal, that is, keep enabled or disabled.

After an indoor positioning unit is used, the indoor positioning unit is in a signal receiving/transmitting state, and can perform indoor positioning on the mobile terminal.

Additionally, when the change information indicates that the mobile terminal is moving from outdoors to indoors, the indoor navigation map may be further loaded, so that the indoor and outdoor navigation maps are seamlessly connected.

For another example, the mobile terminal is located indoors, an indoor positioning unit is positioning the mobile terminal, and when the mobile terminal obtains location relationship change information between the mobile terminal and the multiple-antenna node by using the method of this embodiment of the disclosure, and the change information indicates that the mobile terminal is moving from indoors to outdoors, an outdoor positioning unit in the mobile terminal is used, for example, a GPS or a cellular network. The mobile terminal may preset a use priority of each outdoor positioning unit, so as to preferably select an outdoor positioning unit with a highest priority during use of the outdoor positioning units; or when the outdoor positioning units are used, and meanwhile multiple outdoor positioning units are enabled, a positioning unit that is used to implement outdoor positioning depends on signal strength of each outdoor positioning unit. Control on the indoor positioning unit when the outdoor positioning unit is used may be, for example, the same as control on the outdoor positioning unit when the indoor positioning unit is used.

After an outdoor positioning unit is used, the outdoor positioning unit is in a signal receiving/transmitting state, and can perform outdoor positioning on the mobile terminal.

Additionally, when the change information indicates that the mobile terminal is moving from indoors to outdoors, the outdoor navigation map may be further loaded, so that the indoor and outdoor navigation maps are seamlessly connected.

Optionally, in this embodiment of the disclosure, before the location relationship change information between the mobile terminal and the multiple-antenna node is obtained, the method further includes establishing, by the mobile terminal, a wireless connection to the multiple-antenna node according to a change of a positioning signal.

For example, when a quantity of visible satellites received by the mobile terminal is less than or equal to a first threshold, or when strength of a Wi-Fi or BLUETOOTH signal detected by the mobile terminal is greater than or equal to a second threshold, or when a quantity of Wi-Fi access points or a quantity of BLUETOOTH nodes detected by the mobile terminal is greater than or equal to a fourth threshold, it indicates that an indoor positioning signal of the mobile terminal is weakened, and the mobile terminal may move toward an outdoor direction. In this case, the mobile terminal establishes a wireless connection to the multiple-antenna node.

For example, when a strength of a Wi-Fi or BLUETOOTH signal detected by the mobile terminal is less than or equal to a third threshold, or when a quantity of Wi-Fi access points or a quantity of BLUETOOTH nodes detected by the mobile terminal is less than or equal to a fifth threshold, it indicates that an indoor positioning signal of the mobile terminal is weakened, and the mobile terminal may be moving toward an outdoor direction. In this case, the mobile terminal establishes a wireless connection to the multiple-antenna node.

It should be noted that, signal types of a Wi-Fi signal and a BLUETOOTH signal are different, and strength levels are also different, and therefore when Wi-Fi positioning or BLUETOOTH positioning is separately used, strength magnitudes of the foregoing second threshold are different, and different values are assigned to the second threshold according to positioning manners.

Optionally, in this embodiment of the disclosure, before receiving the N direction-finding signals that are respectively sent by the multiple-antenna node at the N moments, the mobile terminal enables only a positioning unit that is being used, but does not enable another positioning unit. Only when the mobile terminal detects that a positioning signal of a current positioning unit changes, that is, preliminarily determines that the mobile terminal may be moving, or is approaching being indoor or approaching being outdoor, another positioning unit in the mobile terminal is enabled.

For example, when the mobile terminal is located outdoors, only a GPS positioning unit is enabled, and another positioning unit in the mobile terminal is disabled. Only when the mobile terminal detects that a GPS positioning signal is weakened, another positioning unit such as Wi-Fi is enabled.

By using such solution, power consumption waste caused because multiple positioning units are always enabled simultaneously and the positioning units ceaselessly search for signals is avoided.

Because a signal type of the multiple-antenna node may be different from a signal type of a positioning unit that is being used by the mobile terminal, a connection cannot be established between the mobile terminal and the multiple-antenna node. When the mobile terminal detects that a signal of a positioning unit that is being used changes, after another positioning unit is enabled, the mobile terminal may establish a connection to the multiple-antenna node by using a positioning signal consistent with the multiple-antenna node, so as to obtain relatively precise location information of the mobile terminal.

According to the mobile terminal control method provided in this embodiment of the disclosure, multiple direction-finding signals sent by a multiple-antenna node are received, location relationship change information between a mobile terminal and the multiple-antenna node may be obtained in a period of time according to the multiple direction-finding signals, and then the mobile terminal is controlled by matching the change information and according to the location relationship change information. Because the location relationship change information may accurately denote a movement trend of the mobile terminal moving from indoors to outdoors or a movement trend of the mobile terminal moving from outdoors to indoors, the mobile terminal may be controlled based on the accurate movement trend, thereby improving accuracy of controlling the mobile terminal in an aspect of enabling an indoor or outdoor positioning manner, and accuracy of controlling the mobile terminal in an aspect of loading an indoor or outdoor map.

Figure 6:
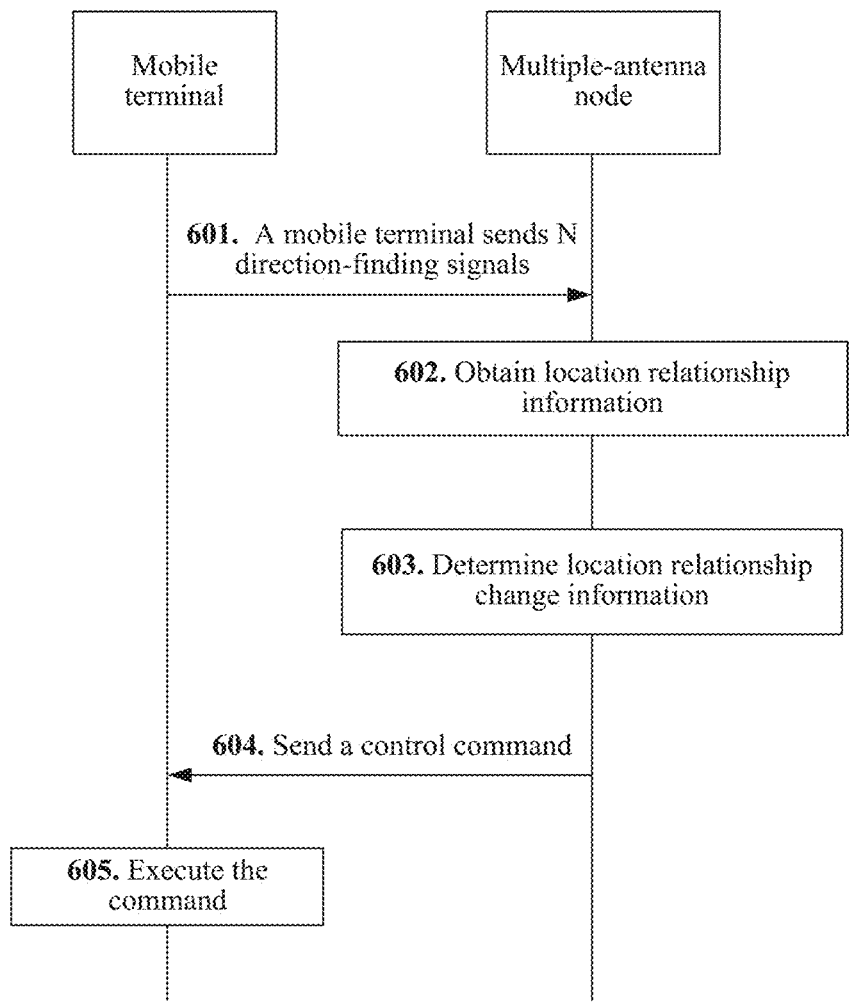
FIG. 6 is a flowchart of another mobile terminal control method according to an embodiment of the disclosure.

FIG. 6 is a flowchart of another mobile terminal control method according to an embodiment of the disclosure. As shown in FIG. 6, the method includes the following steps.

Step 601: A mobile terminal respectively sends N direction-finding signals at N moments to a multiple-antenna node located in an indoor-outdoor critical area; and the multiple-antenna node receives the N direction-finding signals that are respectively sent by the mobile terminal at the N moments.

The multiple-antenna node is located in the indoor-outdoor critical area, and is in a signal receiving/transmitting state.

The multiple-antenna node includes a multiple-antenna Wi-Fi node, or a multiple-antenna BLUETOOTH node.

When detecting a signal of the multiple-antenna node, the mobile terminal begins to send a direction-finding signal to the multiple-antenna node, and the multiple-antenna node begins to receive the direction-finding signal sent by the mobile terminal.

Step 602: The multiple-antenna node obtains N pieces of location relationship information between the multiple-antenna node and the mobile terminal at the N moments according to the N direction-finding signals, where the N moments and the N pieces of location relationship information are in a one-to-one correspondence.

Specifically, when the mobile terminal sends a direction-finding signal at a moment, and the multiple-antenna node receives the direction-finding signal, an azimuth $\varphi$ and an elevation angle $\theta$ between the multiple-antenna node and the mobile terminal may be calculated by using, for example, a 2D MUSIC algorithm, a 2D FBSS algorithm, an FBSS-DOAM algorithm or an ESPRIT algorithm, and information about the azimuth $\varphi$ and the elevation angle $\theta$ between the mobile terminal and the multiple-antenna node is location relationship information between the mobile terminal and the multiple-antenna node.

The multiple-antenna node receives the N direction-finding signals that are respectively sent by the mobile terminal at the N moments; and obtains N azimuths $\varphi$ and N elevation angles $\theta$ between the multiple-antenna node and the mobile terminal at the N moments according to the N direction-finding signals, that is, location relationship information between the multiple-antenna node and the mobile terminal. The multiple-antenna node determines location relationship change information between the multiple-antenna node and the mobile terminal according to the N pieces of location relationship information.

It should be noted that, determining of a coordinate system of $\varphi$ and $\theta$ may be set with reference to, for example, the manner shown in FIG. 5, and details are not described herein again.

Step 603: The multiple-antenna node determines location relationship change information between the multiple-antenna node and the mobile terminal according to at least M of the N pieces of location relationship information, where 2≤M≤N.

If the mobile terminal is moving, location relationships between the multiple-antenna node and the mobile terminal obtained at the N moments are changeable. The multiple-antenna node may obtain location relationship change information between the multiple-antenna node and the mobile terminal according to the location relationship information between the multiple-antenna node and the mobile terminal obtained at the N moments. The location relationship change information denotes information about changes of an azimuth and an elevation angle of the multiple-antenna node relative to the mobile terminal, and is used to denote a movement trend of the mobile terminal, that is, whether the mobile terminal moves from outdoors to indoors, or moves from indoors to outdoors.

For example, when the N pieces of location relationship information obtained at the N moments are $\varphi_1, \varphi_2, \ldots,$ and $\varphi_N$ and $\theta_1, \theta_2, \ldots,$ and $\theta_N$, the location relationship change information between the multiple-antenna node and the mobile terminal may be determined according to the N pieces of location relationship information, or the location relationship change information between the multiple-antenna node and the mobile terminal may be determined by selecting M of the N pieces of location relationship information, and the M pieces of location relationship information may be several continuously selected pieces of location relationship information of the N pieces of location relationship information, or may be several pieces of location relationship information that are selected at intervals, where M≤N.

Step 604: The multiple-antenna node sends a control command matching the location relationship change information to the mobile terminal according to the location relationship change information; and the mobile terminal receives a control command that is returned by the multiple-antenna node according to the N direction-finding signals.

Whether the mobile terminal is moving from indoors to outdoors or from outdoors to indoors can be determined according to the location relationship change information between the multiple-antenna node and the mobile terminal, and the multiple-antenna node sends a control command matching the movement trend, that is, the location relationship change information to the mobile terminal.

How the multiple-antenna node sends the control command matching the location relationship change information to the mobile terminal is specifically described below with reference to FIG. 5.

When $0° \leq \varphi_i \leq 180°$, if an azimuth between the multiple-antenna node and the mobile terminal gradually increases, that is, the location relationship change information is $\varphi_1 < \varphi_2 < \ldots < \varphi_M$, it indicates that a movement trend of the mobile terminal is moving from outdoors to indoors, then the multiple-antenna node sends, corresponding to this movement trend, a first command to the mobile terminal, and the mobile terminal correspondingly receives the first command; or if an azimuth between the multiple-antenna node and the mobile terminal gradually increases, that is, the location relationship change information is $\varphi_1 > \varphi_2 > \ldots > \varphi_M$, it indicates that a movement trend of the mobile terminal is moving from indoors to outdoors, then the multiple-antenna node sends, corresponding to this movement trend, a second command to the mobile terminal, and the mobile terminal correspondingly receives the second command, where $\varphi_i$ is an azimuth at the $i^{th}$ moment, $1 \leq i \leq M$, and M≤N.

When $180° \leq \varphi_i \leq 360°$, if an azimuth between the multiple-antenna node and the mobile terminal gradually decreases, that is, the location relationship change information is $\varphi_1 > \varphi_2 > \ldots > \varphi_M$, it indicates that a movement trend of the mobile terminal is moving from outdoors to indoors, then the multiple-antenna node sends, corresponding to this movement trend, a first command to the mobile terminal, and the mobile terminal correspondingly receives the first command; or if an azimuth between the multiple-antenna node and the mobile terminal gradually increases, that is, the location relationship change information is $\varphi_1 < \varphi_2 < \ldots < \varphi_M$, it indicates that a movement trend of the mobile terminal is moving from indoors to outdoors, then the multiple-antenna node sends, corresponding to this movement trend, a second command to the mobile terminal, and the mobile terminal correspondingly receives the second command, where $\varphi_i$ is an azimuth at the $i^{th}$ moment, $1 \leq i \leq M$, and M≤N.

When $0° \leq \varphi_i \leq 90°$ or $270° \leq \varphi_i \leq 360°$, if an azimuth between the multiple-antenna node and the mobile terminal is unchanged, and an elevation angle between the multiple-antenna node and the mobile terminal gradually decreases, that is, the location relationship change information is $\varphi_1 = \varphi_2 = \ldots = \varphi_M$ and $\theta_1 > \theta_2 > \ldots > \theta_M > 0$, it indicates that a movement trend of the mobile terminal is moving from outdoors to indoors, the multiple-antenna node sends, corresponding to this movement trend, a first command to the mobile terminal, and the mobile terminal correspondingly receives the first command; or if an azimuth between the multiple-antenna node and the mobile terminal is unchanged, and an elevation angle between the multiple-antenna node and the mobile terminal gradually increases, that is, the location relationship change information is $\varphi_1 = \varphi_2 = \ldots = \varphi_M$ and $0 < \theta_1 < \theta_2 < \ldots < \theta_M$, it indicates that a movement trend of the mobile terminal is moving from indoors to outdoors, the multiple-antenna node sends, corresponding to this movement trend, a second command to the mobile terminal, and the mobile terminal correspondingly receives the second command, where $\varphi_i$ is an azimuth at the $i^{th}$ moment, $\theta_i$ is an elevation angle at the $i^{th}$ moment, $1 \leq i \leq M$, and M≤N.

When $90° \leq \varphi_i \leq 270°$, if an azimuth between the multiple-antenna node and the mobile terminal is unchanged, and an elevation angle between the multiple-antenna node and the mobile terminal gradually increases, that is, the location relationship change information is $\varphi_1 = \varphi_2 = \ldots = \varphi_M$ and $0 < \theta_1 < \theta_2 < \ldots < \theta_M$, it indicates that a movement trend of the mobile terminal is moving from outdoors to indoors, the multiple-antenna node sends, corresponding to this movement trend, a first command to the mobile terminal, and the mobile terminal correspondingly receives the first command; or if an azimuth between the multiple-antenna node and the mobile terminal is unchanged, and an elevation angle between the multiple-antenna node and the mobile terminal gradually decreases, that is, the location relationship change information is $\varphi_1 = \varphi_2 = \ldots = \varphi_M$ and $\theta_1 > \theta_2 > \ldots > \theta_M > 0$, it indicates that a movement trend of the mobile terminal is moving from indoors to outdoors, the multiple-antenna node sends, corresponding to this movement trend, a second command to the mobile terminal, and the mobile terminal correspondingly receives the second command, where $\varphi_i$ is an azimuth at the $i^{th}$ moment, $\theta_i$ is an elevation angle at the $i^{th}$ moment, $1 \leq i \leq M$, and M≤N.

Optionally, to more accurately determine the movement trend of the mobile terminal, a control command may be further sent based on any one of the following four conditions and by selecting a control manner matching the location relationship change information according to the location relationship change information, to control the operation of the mobile terminal.

First condition: when $0° \leq \varphi_i \leq 90°$, if an azimuth between the multiple-antenna node and the mobile terminal gradually increases, and an elevation angle between the multiple-antenna node and the mobile terminal gradually decreases, that is, the location relationship change information is $\varphi_1 < \varphi_2 < \ldots < \varphi_M$, and $\theta_1 > \theta_2 > \ldots > \theta_M$, it indicates that a movement trend of the mobile terminal is moving from outdoors to indoors, then the multiple-antenna node sends, corresponding to this movement trend, a first command to the mobile terminal, and the mobile terminal correspondingly receives the first command; or if an azimuth between the multiple-antenna node and the mobile terminal gradually decreases, and an elevation angle between the multiple-antenna node and the mobile terminal gradually increases, that is, the location relationship change information is $\varphi_1 > \varphi_2 > \ldots > \varphi_M$, and $\theta_1 < \theta_2 < \ldots < \theta_M$, it indicates that a movement trend of the mobile terminal is moving from indoors to outdoors, then the multiple-antenna node sends, corresponding to this movement trend, a second command to the mobile terminal, and the mobile terminal correspondingly receives the second command.

Second condition: when $90° \leq \varphi_i \leq 180°$, if an azimuth between the multiple-antenna node and the mobile terminal gradually increases, and an elevation angle between the multiple-antenna node and the mobile terminal gradually increases, that is, the location relationship change information is $\varphi_1 < \varphi_2 < \ldots < \varphi_M$, and $\theta_1 < \theta_2 < \ldots < \theta_M$, it indicates that a movement trend of the mobile terminal is moving from outdoors to indoors, then the multiple-antenna node sends, corresponding to this movement trend, a first command to the mobile terminal, and the mobile terminal correspondingly receives the first command; or if an azimuth between the mobile terminal and the multiple-antenna node gradually decreases, and an elevation angle between the multiple-antenna node and the mobile terminal gradually decreases, that is, the location relationship change information is $\varphi_1 > \varphi_2 > \ldots > \varphi_M$, and $\theta_1 > \theta_2 > \ldots > \theta_M$, it indicates that a movement trend of the mobile terminal is moving from indoors to outdoors, then the multiple-antenna node sends, corresponding to this movement trend, a second command to the mobile terminal, and the mobile terminal correspondingly receives the second command.

Third condition: when $180° \leq \varphi_i \leq 270°$, if an azimuth between the multiple-antenna node and the mobile terminal gradually increases, and an elevation angle between the multiple-antenna node and the mobile terminal gradually decreases, that is, the location relationship change information is $\varphi_1 < \varphi_2 < \ldots < \varphi_M$, and $\theta_1 > \theta_2 > \ldots > \theta_M$, it indicates that a movement trend of the mobile terminal is moving from indoors to outdoors, then the multiple-antenna node sends, corresponding to this movement trend, a second command to the mobile terminal, and the mobile terminal correspondingly receives the second command; or if an azimuth between the multiple-antenna node and the mobile terminal gradually decreases, and an elevation angle between the multiple-antenna node and the mobile terminal gradually increases, that is, the location relationship change information is $\varphi_1 > \varphi_2 > \ldots > \varphi_M$, and $\theta_1 < \theta_2 < \ldots < \theta_M$, it indicates that a movement trend of the mobile terminal is moving from outdoors to indoors, then the multiple-antenna node sends, corresponding to this movement trend, a first command to the mobile terminal, and the mobile terminal correspondingly receives the first command.

Fourth condition: when $270° \leq \varphi_i \leq 360°$, if an azimuth between the multiple-antenna node and the mobile terminal gradually increases, and an elevation angle between the multiple-antenna node and the mobile terminal gradually increases, that is, the location relationship change information is $\varphi_1 < \varphi_2 < \ldots < \varphi_M$, and $\theta_1 < \theta_2 < \ldots < \theta_M$, it indicates that a movement trend of the mobile terminal is moving from indoors to outdoors, then the multiple-antenna node sends, corresponding to this movement trend, a second command to the mobile terminal, and the mobile terminal correspondingly receives the second command; or if an azimuth between the multiple-antenna node and the mobile terminal gradually decreases, and an elevation angle between the multiple-antenna node and the mobile terminal gradually decreases, that is, the location relationship change information is $\varphi_1 > \varphi_2 > \ldots > \varphi_M$, and $\theta_1 > \theta_2 > \ldots > \theta_M$, it indicates that a movement trend of the mobile terminal is moving from outdoors to indoors, then the multiple-antenna node sends, corresponding to this movement trend, a first command to the mobile terminal, and the mobile terminal correspondingly receives the first command.

$\varphi_i$ is an azimuth at the $i^{th}$ moment, and $\theta_i$ is an elevation angle at the $i^{th}$ moment, where $1 \leq i \leq M$.

It should be noted that, in this embodiment of the disclosure, N pieces of location relationship information between the multiple-antenna node and the mobile terminal at N moments are obtained, but different time points may be selected to start an action of sending the first/second command. For example, a preset time length is set, a quantity of obtained location relationships is set, and specific location relationship information is set. For details, refer to descriptions of the preset time length, the quantity of obtained location relationships, and the specific location relationship information in step 104, and the details are not described herein again.

Step 605: The mobile terminal executes the control command.

After receiving the control command sent by the multiple-antenna node, the mobile terminal executes the corresponding control command.

When the control command is the first command, the mobile terminal uses an indoor positioning manner, or loads an indoor navigation map.

When the control command is the second command, the mobile terminal uses an outdoor positioning manner, or loads an outdoor navigation map.

Optionally, in this embodiment of the disclosure, before the location relationship change information between the multiple-antenna node and the mobile terminal is obtained, the method further includes establishing a wireless connection between the multiple-antenna node and the mobile terminal.

According to the another mobile terminal control method provided in this embodiment of the disclosure, a mobile terminal sends multiple direction-finding signals to a multiple-antenna node; after receiving the multiple direction-finding signals, the multiple-antenna node may obtain location relationship change information between the multiple-antenna node and the mobile terminal in a period of time according to the multiple direction-finding signals; and then the mobile terminal receives, according to the location relationship change information, a control command that matches the change information and that is sent by the multiple-antenna node, and executes the control command. Because the location relationship change information may accurately denote a movement trend of the mobile terminal moving from indoors to outdoors or a movement trend of the mobile terminal moving from outdoors to indoors, the mobile terminal may be controlled based on the accurate movement trend, thereby improving accuracy of controlling the mobile terminal in an aspect of enabling an indoor or outdoor positioning manner, and accuracy of controlling the mobile terminal in an aspect of loading an indoor or outdoor map.

An embodiment of the disclosure further provides a mobile terminal control apparatus for implementing steps and methods in the foregoing method embodiments.

It should be noted that, in the foregoing method embodiments, description is performed by using a mobile terminal or a multiple-antenna node as an execution body. In a specific implementation manner, one or more chips in a mobile terminal or one or more chips in a multiple-antenna node may be used as an execution body.

In the foregoing method embodiments, a technical solution for performing communication between a multiple-antenna node and a mobile terminal is described. In a specific implementation manner, multiple multiple-antenna nodes may be disposed in an indoor-outdoor critical area; when being located nearby the indoor-outdoor critical area, a terminal may communicate with the multiple multiple-antenna nodes; a specific location of the mobile terminal may be positioned by using a location relationship (for example, an azimuth or an elevation angle) between the mobile terminal and each multiple-antenna node; and a movement trend of the mobile terminal may be more accurately determined by using specific locations of the mobile terminal at multiple moments, and then the mobile terminal is more accurately controlled.

In the foregoing method embodiments, a technical solution for performing communication between a mobile terminal and a multiple-antenna node is described. In a specific implementation manner, multiple mobile terminals may cooperate to implement the solution in this embodiment. For example, a mobile phone cooperates with a wearable device (for example, a smart band, or smart glasses); after receiving multiple direction-finding signals sent by a multiple-antenna node, the smart band sends the direction-finding signals to the mobile phone for processing; the mobile phone obtains location relationship information between the band the multiple-antenna node according to the direction-finding signals; because the band the mobile phone are carried by a same user, a location relationship between the band the multiple-antenna node is the same as a location relationship between the mobile phone and the multiple-antenna node; and then the mobile phone or the band may be correspondingly controlled.

In another implementation manner, a terminal may be further controlled according to previous location information of the terminal and a current location of the terminal. For example, a terminal previously performs positioning in an outdoor manner, it is calculated, through cooperation between the terminal and a multiple-antenna node, that the terminal is currently being located indoors, and if 90°≤azimuth φ≤270°, it indicates that the terminal already moves from outdoors to indoors, and the terminal may be controlled to perform positioning in an indoor manner. For another example, a terminal previously loads an indoor navigation map, it is calculated, through cooperation between the terminal and a multiple-antenna node, that the terminal is currently being located outdoors, and if 0°≤azimuth φ≤90° or 270°≤azimuth φ≤360°, it indicates that the terminal already moves from indoors to outdoors, and the terminal may be controlled to load an outdoor navigation map.

Figure 7:
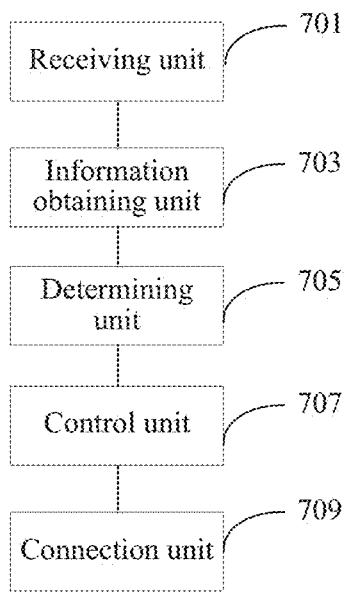
FIG. 7 is a schematic diagram of a mobile terminal control apparatus according to an embodiment of the disclosure.

FIG. 7 is a schematic diagram of a mobile terminal control apparatus according to an embodiment of the disclosure. The mobile terminal control apparatus is included in a mobile terminal. As shown in FIG. 7, the control apparatus includes a receiving unit 701, an information obtaining unit 703, a determining unit 705 and a control unit 707.

The receiving unit 701 is configured to receive N direction-finding signals that are respectively sent by a multiple-antenna node at N moments. The multiple-antenna node is located in an indoor-outdoor critical area.

The information obtaining unit 703 is configured to obtain N pieces of location relationship information between the mobile terminal and the multiple-antenna node at the N moments according to the N direction-finding signals, where the N moments and the N pieces of location relationship information are in a one-to-one correspondence, and N≥2.

The determining unit 705 is configured to determine location relationship change information between the mobile terminal and the multiple-antenna node according to at least M of the N pieces of location relationship information, where 2≤M≤N.

The control unit 707 is configured to control the mobile terminal by matching the location relationship change information and according to the location relationship change information.

Further, the information obtaining unit 703 is specifically configured to:

obtain N azimuths φ and N elevation angles θ between the mobile terminal and the multiple-antenna node at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, and the straight line k1 is a connecting line between a projection of the mobile terminal on the ground and the original point; and θ is an angle between a straight line k2 and a negative direction of the z-axis, and the straight line k2 is a connecting line between the mobile terminal and the multiple-antenna node.

Further, the control unit 707 is specifically configured to: when $0°≤φ_i≤180°$, if $φ_1<φ_2<\ldots<φ_M$, control the mobile terminal in a first manner, or if $φ_1>φ_2>\ldots>φ_M$, control the mobile terminal in a second manner; or when $180°≤φ_i≤360°$, if $φ_1>φ_2>\ldots>φ_M$, control the mobile terminal in a first manner, or if $φ_1<φ_2<\ldots<φ_M$, control the mobile terminal in a second manner; or when $0°≤φ_i≤90°$ or $270°≤φ_i≤360°$, if $φ_1=φ_2=\ldots=φ_M$ and $θ_1>θ_2>\ldots>θ_M>0$, control the mobile terminal in a first manner, or if $φ_1=φ_2=\ldots=φ_M$ and $0<θ_1<θ_2<\ldots<θ_M$, control the mobile terminal in a second manner; or when $90°≤φ_i≤270°$, if $φ_1=φ_2=\ldots=φ_M$ and $0<θ_1<θ_2<\ldots<θ_M$, control the mobile terminal in a first manner, or if $q=φ_2=\ldots=φ_M$ and $θ_1>θ_2>\ldots>θ_M>0$, control the mobile terminal in a second manner, where $cφ_i$ is an azimuth at the $i^{th}$ moment, $θ_i$ is an elevation angle at the $i^{th}$ moment, $1≤i≤M$, the first manner matches a movement trend of the mobile terminal moving from outdoors to indoors, and the second manner matches a movement trend of the mobile terminal moving from indoors to outdoors.

Optionally, the control unit 707 may be specifically configured to: when $0°≤φ_i≤90°$, if $φ_1<φ_2<\ldots<φ_M$, and $θ_1>θ_2>\ldots>θ_M$, control the mobile terminal in a first manner, or if $φ_1>φ_2>\ldots>φ_M$, and $θ_1<θ_2<\ldots<θ_M$, control the mobile terminal in a second manner; or when $90°≤φ_i≤180°$, if $φ_1<φ_2<\ldots<φ_M$, and $θ_1<θ_2<\ldots<θ_M$, control the mobile terminal in a first manner, or if $φ_1>φ_2>\ldots>φ_M$, and $θ_1>θ_2>\ldots>θ_M$, control the mobile terminal in a second manner; or when $180°≤φ_i≤270°$, if $φ_1<φ_2<\ldots<φ_M$, and $\theta_1 > \theta_2 > \ldots > \theta_M$, control the mobile terminal in a second manner, or if $\varphi_1 > \varphi_2 > \ldots > \varphi_M$, and $\theta_1 < \theta_2 < \ldots < \theta_M$, control the mobile terminal in a first manner; or when $270° \leq \varphi_i \leq 360°$, if $\varphi_1 < \varphi_2 < \ldots < \varphi_M$, and $\theta_1 < \theta_2 < \ldots < \theta_M$, control the mobile terminal in a second manner, or if $\varphi_1 > \varphi_2 > \ldots > \varphi_M$, and $\theta_1 > \theta_2 > \ldots > \theta_M$, control the mobile terminal in a first manner, where $\varphi_i$ is an azimuth at the $i^{th}$ moment, and $\theta_i$ is an elevation angle at the $i^{th}$ moment, where $1 \leq i \leq M$.

Further, when controlling the mobile terminal in the first manner, the control unit 707 is specifically configured to control the mobile terminal to use an indoor positioning manner, or control the mobile terminal to load an indoor navigation map.

Further, when controlling the mobile terminal in the second manner, the control unit 707 is specifically configured to control the mobile terminal to use an outdoor positioning manner, or control the mobile terminal to load an outdoor navigation map.

Further, the indoor positioning manner may include Wi-Fi positioning, BLUETOOTH positioning, magnetic field positioning or light ray positioning.

Further, the outdoor positioning manner includes GNSS positioning, cellular network positioning, or Wi-Fi positioning.

Optionally, the control apparatus of this embodiment of the disclosure may further include a connection unit 709, configured to: before the receiving unit 701 receives the N direction-finding signals that are respectively sent by the multiple-antenna node at the N moments, and when a quantity of visible satellites received by the mobile terminal is less than or equal to a first threshold, establish a wireless connection to the multiple-antenna node; or before the receiving unit 701 receives the N direction-finding signals that are respectively sent by the multiple-antenna node at the N moments, and when strength of a Wi-Fi signal detected by the mobile terminal is greater than or equal to a second threshold, establish a wireless connection to the multiple-antenna node; or before the receiving unit 701 receives the N direction-finding signals that are respectively sent by the multiple-antenna node at the N moments, and when strength of a Wi-Fi signal detected by the mobile terminal is less than or equal to a third threshold, establish a wireless connection to the multiple-antenna node; or before the receiving unit 701 receives the N direction-finding signals that are respectively sent by the multiple-antenna node at the N moments, and when a quantity of Wi-Fi access points or a quantity of BLUETOOTH nodes detected by the mobile terminal is greater than or equal to a fourth threshold, establish a wireless connection to the multiple-antenna node; or before the receiving unit 701 receives the N direction-finding signals that are respectively sent by the multiple-antenna node at the N moments, and when a quantity of Wi-Fi access points or a quantity of BLUETOOTH nodes detected by the mobile terminal is less than or equal to a fifth threshold, establish a wireless connection to the multiple-antenna node.

The mobile terminal control apparatus provided in this embodiment of the disclosure is configured to implement the methods shown in the embodiments shown in FIG. 1 to FIG. 5. For details of an operating principle and an operating process of the mobile terminal control apparatus and technical effects generated by the mobile terminal control apparatus, refer to the embodiments shown in FIG. 1 to FIG. 5, and the details are not described herein again.

Figure 8:
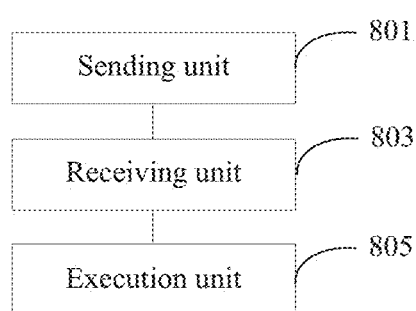
FIG. 8 is a schematic diagram of another mobile terminal control apparatus according to an embodiment of the disclosure.

FIG. 8 is a schematic diagram of another mobile terminal control apparatus according to an embodiment of the disclosure. The mobile terminal control apparatus is included in a mobile terminal. The control apparatus shown in FIG. 8 includes a sending unit 801, a receiving unit 803, and an execution unit 805.

The sending unit 801 is configured to respectively send N direction-finding signals at N moments to a multiple-antenna node located in an indoor-outdoor critical area, where N≥2.

The receiving unit 803 is configured to receive a control command that is returned by the multiple-antenna node according to the N direction-finding signals.

The execution unit 805 is configured to execute the control command.

Further, the control command includes a first command matching a movement trend of the mobile terminal moving from outdoors to indoors, or a second command matching a movement trend of the mobile terminal moving from indoors to outdoors.

Further, when the control command is the first command, the execution unit 805 is specifically configured to use an indoor positioning manner, or load an indoor navigation map.

Further, when the control command is the second command, the execution unit 805 is specifically configured to use an outdoor positioning manner, or load an outdoor navigation map.

The mobile terminal of this embodiment of the disclosure sends a direction-finding signal, and executes a corresponding action according to a received control command, and therefore mobile terminal control precision can be improved.

The mobile terminal control apparatus provided in this embodiment of the disclosure is configured to implement the method shown in the embodiment shown in FIG. 6. For details of an operating principle and an operating process of the mobile terminal control apparatus and technical effects generated by the mobile terminal control apparatus, refer to the embodiment shown in FIG. 6, and the details are not described herein again.

Figure 9:
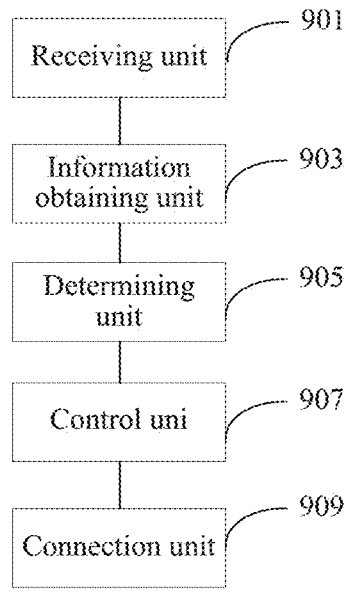
FIG. 9 is a schematic diagram of a multiple-antenna node control apparatus according to an embodiment of the disclosure.

FIG. 9 is a schematic diagram of a multiple-antenna node control apparatus according to an embodiment of the disclosure. The multiple-antenna node control apparatus is included in a multiple-antenna node. The control apparatus shown in FIG. 9 includes a receiving unit 901, an information obtaining unit 903, a determining unit 905 and a control unit 907.

The receiving unit 901 is configured to receive N direction-finding signals that are respectively sent by a mobile terminal at N moments, where the multiple-antenna node is located in an indoor-outdoor critical area.

It should be noted that, the multiple-antenna node includes multiple-antenna Wi-Fi, or multiple-antenna BLUETOOTH.

The information obtaining unit 903 is configured to obtain N pieces of location relationship information between the multiple-antenna fixed node and the mobile terminal at the N moments according to the N direction-finding signals, where the N moments and the N pieces of location relationship information are in a one-to-one correspondence, and N≥2.

The determining unit 905 is configured to determine location relationship change information between the multiple-antenna fixed node and the mobile terminal according to at least M of the N pieces of location relationship information, where 2≤M≤N.

The control unit 907 is configured to send a control command matching the location relationship change information to the mobile terminal according to the location relationship change information.

Further, the information obtaining unit 903 is specifically configured to: obtain N azimuths φ and N elevation angles θ between the multiple-antenna fixed node and the mobile terminal at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, and the straight line k1 is a connecting line between a projection of the mobile terminal on the ground and the original point; and θ is an angle between a straight line k2 and a negative direction of the z-axis, and the straight line k2 is a connecting line between the multiple-antenna fixed node and the mobile terminal.

Further, the control unit 907 is specifically configured to: when $0° \le \varphi_i \le 180°$, if $\varphi_1 < \varphi_2 < \ldots < \varphi_M$, send a first command to the mobile terminal, or if $\varphi_1 > \varphi_2 > \ldots > \varphi_M$, send a second command to the mobile terminal; or when $180° \le \varphi_i \le 360°$, if $\varphi_1 > \varphi_2 > \ldots > \varphi_M$, send a first command to the mobile terminal, or if $\varphi_1 < \varphi_2 < \ldots < \varphi_M$, send a second command to the mobile terminal; or when $0° \le \varphi_i \le 90°$ or $270° \le \varphi_i \le 360°$, if $\varphi_1 = \varphi_2 = \ldots = \varphi_M$ and $\theta_1 > \theta_2 > \ldots > \theta_M > 0$, send a first command to the mobile terminal, or if $\varphi_1 = \varphi_2 = \ldots = \varphi_M$ and $0 < \theta_1 < \theta_2 < \ldots < \theta_M$, send a second command to the mobile terminal; or when $90° \le \varphi_i \le 270°$, if $\varphi_1 = \varphi_2 = \ldots = \varphi_M$ and $0 < \theta_1 < \theta_2 < \ldots < \theta_M$, send a first command to the mobile terminal, or if $\varphi_1 = \varphi_2 = \ldots = \varphi_M$ and $\theta_1 > \theta_2 > \ldots > \theta_M > 0$, send a second command to the mobile terminal, where $\varphi_i$ is an azimuth at the $i^{th}$ moment, $\theta_i$ is an elevation angle at the $i^{th}$ moment, $1 \le i \le M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

Optionally, the control unit 907 may be further specifically configured to: when $0° \le \varphi_i \le 90°$, if $\varphi_1 < \varphi_2 < \ldots < \varphi_M$, and $\theta_1 > \theta_2 > \ldots > \theta_M$, send, by the multiple-antenna node, a first command to the mobile terminal, or if $\varphi_1 > \varphi_2 > \ldots > \varphi_M$, and $\theta_1 < \theta_2 < \ldots < \theta_M$, send, by the multiple-antenna node, a second command to the mobile terminal; or when $90° \le \varphi_i \le 180°$, if $\varphi_1 < \varphi_2 < \ldots < \varphi_M$, and $\theta_1 < \theta_2 < \ldots < \theta_M$, send, by the multiple-antenna node, a first command to the mobile terminal, or if $\varphi_1 > \varphi_2 > \ldots > \varphi_M$, and $\theta_1 > \theta_2 > \ldots > \theta_M$, send, by the multiple-antenna node, a second command to the mobile terminal; or when $180° \le \varphi_i \le 270°$, if $\varphi_1 < \varphi_2 < \ldots < \varphi_M$, and $\theta_1 > \theta_2 > \ldots > \theta_M$, send, by the multiple-antenna node, a second command to the mobile terminal, or if $\varphi_1 > \varphi_2 > \ldots > \varphi_M$, and $\theta_1 < \theta_2 < \ldots < \theta_M$, send, by the multiple-antenna node, a first command to the mobile terminal; or when $270° \le \varphi_i \le 360°$, if $\varphi_1 < \varphi_2 < \ldots < \varphi_M$, and $\theta_1 < \theta_2 < \ldots < \theta_M$, send, by the multiple-antenna node, a second command to the mobile terminal, or if $\varphi_1 > \varphi_2 > \ldots > \varphi_M$, and $\theta_1 > \theta_2 > \ldots > \theta_M$, send, by the multiple-antenna node, a first command to the mobile terminal, where $\varphi_i$ is an azimuth at the $i^{th}$ moment, $\theta_i$ is an elevation angle at the $i^{th}$ moment, $1 \le i \le M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

Further, the first command is used to instruct the mobile terminal to use an indoor positioning manner, or the mobile terminal to load an indoor navigation map.

Further, the second command is used to instruct the mobile terminal to use an outdoor positioning manner, or the mobile terminal to load an outdoor navigation map.

Optionally, the control apparatus of this embodiment of the disclosure further includes a connection unit 909, configured to before the receiving unit 901 receives the N direction-finding signals that are respectively sent by the mobile terminal at the N moments, establish a wireless connection to the mobile terminal.

The multiple-antenna node control apparatus provided in this embodiment of the disclosure is configured to implement the method shown in the embodiment shown in FIG. 6. For details of an operating principle and an operating process of the multiple-antenna node control apparatus and technical effects generated by the multiple-antenna node control apparatus, refer to the embodiment shown in FIG. 6, and the details are not described herein again.

It should be noted that, any control apparatus provided in the embodiments shown in FIG. 7 to FIG. 9 may be a chip, and the chip is located in a mobile terminal or a multiple-antenna node, and configured to implement the solution provided in this embodiment of the disclosure.

Figure 10:
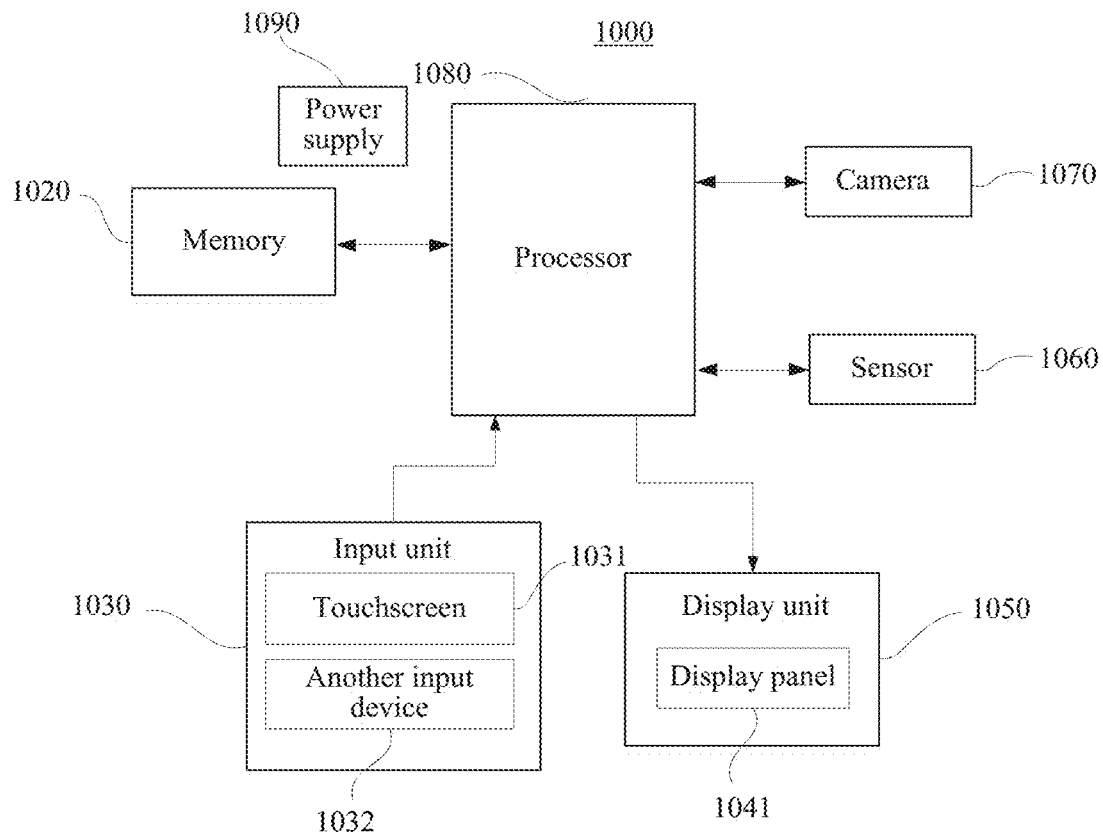
FIG. 10 is a schematic structural diagram of a mobile terminal according to an embodiment of the disclosure.

FIG. 10 is a schematic structural diagram of a mobile terminal according to an embodiment of the disclosure. The terminal device provided in this embodiment of the disclosure may be configured to implement the foregoing methods in the embodiments shown in FIG. 1 to FIG. 5. For convenience of description, only a part related to the embodiments of the disclosure is shown. For specific technical details that are not disclosed, refer to the embodiments of the disclosure shown in FIG. 1 to FIG. 5.

The mobile terminal may be a mobile phone, a tablet computer, a notebook computer, a ultra-mobile personal computer (UMPC), a netbook, a personal digital assistant (PDA), or the like. In this embodiment of the disclosure, description is made by using an example in which the mobile terminal is a mobile phone. FIG. 10 is a block diagram of a partial structure of a mobile phone 1000 related to each embodiment of the disclosure.

As shown in FIG. 10, the mobile phone 1000 includes components such as a memory 1020, an input unit 1030, a display unit 1040, a sensor 1050, a camera 1060, a processor 1070, and a power supply 1080. A person skilled in the art may understand that the structure of the mobile phone shown in FIG. 10 does not constitute any limitation to the mobile phone, and the mobile phone may include more components or fewer components than those shown in the figure, or some components may be combined, or a different component deployment may be used.

The components of the mobile phone 1000 are specifically described below with reference to FIG. 10.

The memory 1020 may be configured to store a software program and a module, and the processor 1070 executes various function applications and data processing of the mobile phone 1000 by running the software program and the module stored in the memory 1020. The memory 1020 may mainly include a program storage area and a data storage area. The program storage area may store an operating system, an application program required by at least one function (such as a sound playback function and an image display function), and the like. The data storage area may store data (such as audio data, image data, and an address book) created according to use of the mobile phone 1000, and the like. In addition, the memory 1020 may include a high-speed random access memory, and may also include a non-volatile memory such as at least one disk storage component, a flash memory component, or another volatile solid-state storage component.

The input unit 1030 may be configured to: receive input digit or character information, and generate key signal input related to a user setting and function control of the mobile phone 1000. Specifically, the input unit 1030 may include a touchscreen 1031 and another input device 1032. The touchscreen 1031, which is also referred to as a touch panel, may collect a touch operation of a user on or near the touchscreen (such as an operation of a user on or near the touchscreen 1031 by using any suitable object or accessory such as a finger or a stylus), and drive a corresponding connection apparatus according to a preset program. Optionally, the touchscreen 1031 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1070. Moreover, the touch controller can receive and execute a command sent from the processor 1070. In addition, the touchscreen 1031 may be implemented in various types such as resistance-type, capacitance-type, infrared, and surface acoustic wave. In addition to the touchscreen 1031, the input unit 1030 may further include the another input device 1032. Specifically, the another input device 1032 may include, but is not limited to, one or more of a physical keyboard, a functional key (such as a volume control key or a power supply switch key), a trackball, a mouse, and a joystick.

The display unit 1040 may be configured to display information input by the user or information provided for the user, and various menus of the mobile phone 1000. The display unit 1040 may include a display panel 1041. Optionally, the display panel 1041 may be configured by using a liquid crystal display (LCD), an organic light-emitting diode (OLED), or the like. Further, the touchscreen 1031 may cover the display panel 1041. After detecting a touch operation on or near the touchscreen 1031, the touchscreen 1031 transfers the touch operation to the processor 1070, so as to determine a type of a touch event. Then, the processor 1070 provides corresponding visual output on the display panel 1041 according to the type of the touch event. A fingerprint collection apparatus such as an optic fiber may be further installed above or below the touch screen 1031, and when a finger presses the touch screen 1031, lines on the finger generate a fingerprint image used for fingerprint collection and identification. Although, in FIG. 10, the touchscreen 1031 and the display panel 1041 are used as two separate parts to implement input and output functions of the mobile phone 1000, in some embodiments, the touchscreen 1031 and the display panel 1041 may be integrated to implement the input and output functions of the mobile phone 1000.

The mobile phone 1000 may further include at least one sensor 1050, such as an optical sensor, a motion sensor, a density sensor, a fingerprint sensor and other sensors. Specifically, the optical sensor may include an ambient light sensor and a proximity sensor. The ambient light sensor may adjust brightness of the display panel 1041 according to brightness of ambient light. The proximity sensor may detect whether there is an object approaching or touching the mobile phone, and may turn off the display panel and/or backlight when the mobile phone 1000 is moved to an ear. As one type of motion sensor, an accelerometer sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). The density sensor may detect density of a material in contact with the mobile phone. The fingerprint sensor is configured to collect a fingerprint that is input by the user. Other sensors, such as a gyroscope, a barometer, a hygrometer, a thermometer, and an infrared sensor, which may be configured in the mobile phone 1000 are not further described herein. It should be noted that, when there is another fingerprint collection apparatus in the mobile phone, there may be no fingerprint sensor.

The camera 1060 is a built-in camera, a front-facing camera, or a rear-facing camera of the mobile phone.

The processor 1070 is a control center of the mobile phone 1000, and connects to various parts of the mobile phone by using various interfaces and lines. By running or executing the software program and/or module stored in the memory 1020, and invoking data stored in the memory 1020, the processor 1070 performs various functions and data processing of the mobile phone, thereby performing overall monitoring on the mobile phone 1000. Optionally, the processor 1070 may include one or more processing units. Preferably, the processor 1070 may integrate an application processor and a modem. The application processor mainly processes an operating system, a user interface, an application program, and the like. The modem mainly processes wireless communication. It may be understood that, the foregoing modem may also not be integrated into the processor 1070.

The mobile phone 1000 further includes the power supply 1080 (such as a battery) for supplying power to the components. Preferably, the power supply may logically connect to the processor 1070 by using a power supply management system, thereby implementing functions, such as charging, discharging, and power consumption management, by using the power supply management system.

Although not shown, the mobile phone 1000 may further include radio frequency (RF) circuit, an audio circuit, a WiFi module, a BLUETOOTH module and the like, and details are not described herein.

In this embodiment of the disclosure, the processor 1070 is configured to read program code and data stored in the memory 1020, and execute the following operations: receiving N direction-finding signals that are respectively sent by a multiple-antenna node at N moments, where the multiple-antenna node is located in an indoor-outdoor critical area; obtaining N pieces of location relationship information between a mobile terminal and the multiple-antenna node at the N moments according to the N direction-finding signals, where the N moments and the N pieces of location relationship information are in a one-to-one correspondence; determining location relationship change information between the mobile terminal and the multiple-antenna node according to at least M of the N pieces of location relationship information, where $2 \leq M \leq N$; and controlling the mobile terminal by matching the location relationship change information and according to the location relationship change information.

Further, the obtaining N pieces of location relationship information between a mobile terminal and the multiple-antenna node at the N moments according to the N direction-finding signals includes obtaining N azimuths φ and N elevation angles θ between the mobile terminal and the multiple-antenna node at the N moments according to the N direction-finding signals, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, and the straight line k1 is a connecting line between a projection of the mobile terminal on the ground and the original point; and θ is an angle between a straight line k2 and a negative direction of the z-axis, and the straight line k2 is a connecting line between the mobile terminal and the multiple-antenna node.

Further, the controlling the mobile terminal by matching the location relationship change information and according to the location relationship change information may specifically include when $0°≤φ_i≤180°$, if $φ_1<φ_2<\ldots<φ_M$, controlling the mobile terminal in a first manner, or if $φ_1>φ_2>\ldots>φ_M$, controlling the mobile terminal in a second manner; or when $180°≤φ_i≤360°$, if $φ_1>φ_2>\ldots>φ_M$, controlling the mobile terminal in a first manner, or if $φ_1<φ_2<\ldots<φ_M$, controlling the mobile terminal in a second manner; or when $0°≤φ_i≤90°$ or $270°≤qφ_i≤360°$, if $φ_1=φ_2=\ldots=φ_M$ and $θ_1>θ_2>\ldots>θ_M>0$, controlling the mobile terminal in a first manner, or if $φ_1=φ_2=\ldots=φ_M$ and $0<θ_1<θ_2<\ldots<θ_M$, controlling the mobile terminal in a second manner; or when $90°≤φ_i≤270°$, if $φ_1=φ_2=\ldots=φ_M$ and $0<θ_1<θ_2<\ldots<θ_M$, controlling the mobile terminal in a first manner, or if $φ_1=φ_2=\ldots=φ_M$ and $θ_1>θ_2>\ldots>θ_M>0$, controlling the mobile terminal in a second manner, where $φ_i$ is an azimuth at the $i^{th}$ moment, $θ_i$ is an elevation angle at the $i^{th}$ moment, $1≤i≤M$, $M≤N$, the first manner matches a movement trend of the mobile terminal moving from outdoors to indoors, and the second manner matches a movement trend of the mobile terminal moving from indoors to outdoors.

Optionally, the controlling the mobile terminal by matching the location relationship change information and according to the location relationship change information may specifically include when $0°≤φ_i≤90°$, if $φ_1<φ_2<\ldots<φ_M$, and $θ_1>θ_2>\ldots>θ_M$, controlling the mobile terminal in a first manner, or if $φ_1>φ_2>\ldots>φ_M$, and $θ_1<θ_2<\ldots<θ_M$, controlling the mobile terminal in a second manner; or when $90°≤φ_i≤180°$, if $φ_1<φ_2<\ldots<φ_M$, and $θ_1<θ_2<\ldots<θ_M$, controlling the mobile terminal in a first manner, or if $φ_1>φ_2>\ldots>φ_M$, and $θ_1>θ_2>\ldots>θ_M$, controlling the mobile terminal in a second manner; or when $180°≤φ_i≤270°$, if $φ_1<φ_2<\ldots<φ_M$, and $θ_1>θ_2>\ldots>θ_M$, controlling the mobile terminal in a second manner, or if $φ_1>φ_2>\ldots>φ_M$ and $θ_1<θ_2<\ldots<θ_M$, controlling the mobile terminal in a first manner; or when $270°≤φ_i≤360°$, if $φ_1<φ_2<\ldots<φ_M$, and $θ_1<θ_2<\ldots<θ_M$, controlling the mobile terminal in a second manner, or if $φ_1>φ_2>\ldots>φ_M$, and $θ_1>θ_2>\ldots>θ_M$, controlling the mobile terminal in a first manner, where $φ_i$ is an azimuth at the $i^t$ moment, $θ_i$ is an elevation angle at the $i^{th}$ moment, $1≤i≤M$, the first manner matches a movement trend of the mobile terminal moving from outdoors to indoors, and the second manner matches a movement trend of the mobile terminal moving from indoors to outdoors.

Further, the controlling the mobile terminal in a first manner includes controlling the mobile terminal to use an indoor positioning manner, or controlling the mobile terminal to load an indoor navigation map.

Further, the controlling the mobile terminal in a second manner includes controlling the mobile terminal to use an outdoor positioning manner, or controlling the mobile terminal to load an outdoor navigation map.

Further, before receiving the N direction-finding signals that are respectively sent by the multiple-antenna node at the N moments, the processor further executes: when a quantity of visible satellites received by the mobile terminal is less than or equal to a first threshold, establishing a wireless connection to the multiple-antenna node; or when strength of a Wi-Fi signal detected by the mobile terminal is greater than or equal to a second threshold, establishing a wireless connection to the multiple-antenna node; or when strength of a Wi-Fi signal detected by the mobile terminal is less than or equal to a third threshold, establishing a wireless connection to the multiple-antenna node; or when a quantity of Wi-Fi access points or a quantity of BLUETOOTH nodes detected by the mobile terminal is greater than or equal to a fourth threshold, establishing a wireless connection to the multiple-antenna node; or when a quantity of Wi-Fi access points or a quantity of BLUETOOTH nodes detected by the mobile terminal is less than or equal to a fifth threshold, establishing a wireless connection to the multiple-antenna node.

Further, the indoor positioning manner includes Wi-Fi positioning, BLUETOOTH positioning, magnetic field positioning or light ray positioning.

Further, the outdoor positioning manner includes GNSS positioning, cellular network positioning, or Wi-Fi positioning.

The mobile terminal provided in this embodiment of the disclosure is configured to implement the methods shown in the embodiments shown in FIG. 1 to FIG. 5. For details of an operating principle and an operating process of the mobile terminal and technical effects generated by the mobile terminal, refer to the embodiments shown in FIG. 1 to FIG. 5, and the details are not described herein again.

An embodiment of the disclosure provides another mobile terminal that has a structure basically the same as that of the mobile terminal shown in FIG. 10. The mobile terminal may include a processor; a memory; and a communications interface, where the processor, the memory and the communications interface communicate with each other by using a bus; and the processor reads program code and data stored in the memory, and executes the following operations: respectively sending N direction-finding signals at N moments to a multiple-antenna node located in an indoor-outdoor critical area, where $N≥2$; receiving a control command that is returned by the multiple-antenna node according to the N direction-finding signals; and executing the control command.

Further, the control command includes a first command matching a movement trend of the mobile terminal moving from outdoors to indoors; or a second command matching a movement trend of the mobile terminal moving from indoors to outdoors.

Further, the control command is the first command, and the executing, by the processor, the control command includes using an indoor positioning manner, or loading an indoor navigation map.

Further, the control command is the second command, and the executing, by the processor, the control command includes using an outdoor positioning manner, or loading an outdoor navigation map.

The mobile terminal provided in this embodiment of the disclosure is configured to implement the method shown in the embodiment shown in FIG. 6. For details of an operating principle and an operating process of the mobile terminal and technical effects generated by the mobile terminal, refer to the embodiment shown in FIG. 6, and the details are not described herein again.

Figure 11:
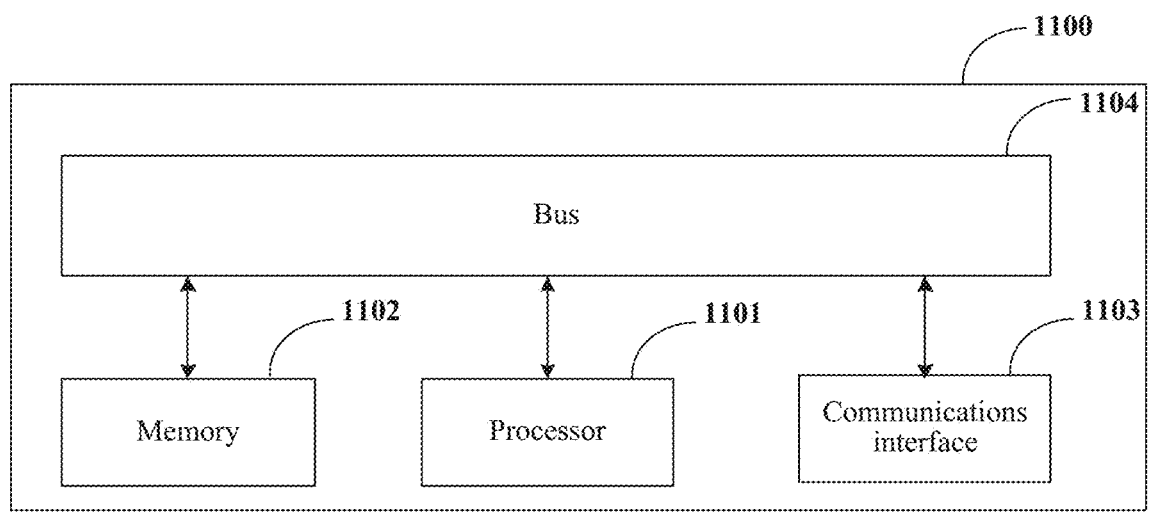
FIG. 11 is a schematic diagram of a multiple-antenna node according to an embodiment of the disclosure.

FIG. 11 is a schematic diagram of a multiple-antenna node according to an embodiment of the disclosure. The multiple-antenna node is located in an indoor-outdoor critical area, and includes a processor 1101, a memory 1102, a communications interface 1103, and a bus 1104.

The memory 1102 may include a storage medium and a memory unit. The storage medium may be read-only such as a read-only memory (ROM), or be readable/writable such as a hard disk or flash memory. The memory unit may be a random access memory (RAM). The memory unit and the processor 1101 may be physically integrated, or the memory unit is integrated in the processor 1101, or constructed in one or more independent units.

The processor 1101 is a control center of the multiple-antenna node 1100 and provides sequencing and processing facilities to execute an instruction, execute an interruption operation, and provide a timing function and many other functions. Optionally, the processor 1101 includes one or more central processing units (CPU). Optionally, the multiple-antenna node 1100 includes more than one processor. The processor 1101 may be a single-core (single-CPU) processor or a multi-core (multi-CPU) processor, or may be a digital signal processor (DSP). The term "processor" used in this text refers to one or more devices, circuits and/or processing kernels configured to process data such as a computer program instruction.

The processor 1101 may execute program code stored in the data storage apparatus 1102. Optionally, the program code stored in the storage medium of the data storage apparatus 1102 may be replicated to the memory unit, so as to help the processor execute the program code. The processor may execute at least one kernel (for example, a kernel in an operating system sold with a trademark such as LINUZ™, UNIX™, WINDOWS™, ANDROID™, or IOS™), and it is well known that the kernel is configured to control operations of the terminal device 1100 by controlling execution of other programs or processes, controlling communication with a peripheral, and controlling use of resources of a computing device.

The multiple-antenna node 1100 further includes the communications interface 1103, configured to communicate with another device or system directly or by using an external network.

The foregoing elements of the multiple-antenna node 1100 may be coupled to each other by using any one of or any combination of the bus 1104 such as a data bus, an address bus, a control bus, an extended bus or a local bus.

Optionally, the multiple-antenna node 1100 further includes an output device and an input device (not shown). The output device is coupled to the processor 1101, and can display information in one or more manners. An example of the output device is a visual display device, for example, a LCD, a light emitting diode (LED) display, a cathode-light ray tube (CRT), or a projector. The input device is also coupled to the processor 1101, and can receive user input of the multiple-antenna node 1100 in one or more manners. An example of the input device includes a mouse, a keyboard, a touchscreen device, a sensing device, or the like.

The multiple-antenna node 1100 may be a general-purpose computing device or an application specific computing device. As a practical example, the foregoing multiple-antenna node 1100 may be a desktop computer, a notebook computer, a network server, a PDA, a mobile phone, a tablet computer, a wireless terminal device, a telecommunications device, or an embedded system that possesses multiple antennas, or any other device that has a structure similar to that shown in FIG. 11. However, the disclosure is not merely limited to any particular type of terminal device.

The processor 1101 of the multiple-antenna node 1100 of this embodiment of the disclosure reads program code and data that are stored in the memory 1102, and executes the following operations: receiving N direction-finding signals that are respectively sent by a mobile terminal at N moments; obtaining N pieces of location relationship information between the multiple-antenna node and the mobile terminal at the N moments according to the N direction-finding signals, where the N moments and the N pieces of location relationship information are in a one-to-one correspondence; determining location relationship change information between the multiple-antenna node and the mobile terminal according to at least M of the N pieces of location relationship information, where 2≤M≤N; and sending a control command matching the location relationship change information to the mobile terminal according to the location relationship change information.

Further, the obtaining N pieces of location relationship information between the multiple-antenna node and the mobile terminal at the N moments includes obtaining N azimuths p and N elevation angles θ between the multiple-antenna node and the mobile terminal at the N moments, where a ground is an x-y plane, a projection of the multiple-antenna node on the x-y plane is an original point, a z-axis is perpendicular to the x-y plane and points upward, a y-axis is parallel to an indoor-outdoor interface, and an x-axis is perpendicular to the y-axis and points to an outdoor direction; φ is an angle between a straight line k1 and a positive direction of the x-axis, and the straight line k1 is a connecting line between a projection of the mobile terminal on the ground and the original point; and θ is an angle between a straight line k2 and a negative direction of the z-axis, and the straight line k2 is a connecting line between the multiple-antenna node and the mobile terminal.

Further, the sending, by matching the location relationship change information and according to the location relationship change information, a command for controlling the mobile terminal includes when $0°≤φ_i≤180°$, if $φ_1<φ_2<\ldots<φ_M$, sending a first command to the mobile terminal, or if $φ_1>φ_2>\ldots>φ_M$, sending a second command to the mobile terminal; or when $180°≤φ_i≤360°$, if $φ_1>φ_2>\ldots>φ_M$, sending a first command to the mobile terminal, or if $φ_1<φ_2<\ldots<φ_M$, sending a second command to the mobile terminal; or when $0°≤φ_i≤90°$ or $270°≤φ_i≤360°$, if $φ_1=φ_2=\ldots=φ_M$ and $θ_1>θ_2>\ldots>θ_M>0$, sending a first command to the mobile terminal, or if $q=φ_2=\ldots=φ_M$ and $0<θ_1<θ_2<\ldots<θ_M$, sending a second command to the mobile terminal; or when $90°≤φ_i≤270°$, if $φ_1=φ_2=\ldots=φ_M$ and $0<θ_1<θ_2<\ldots<θ_M$, sending a first command to the mobile terminal, or if $φ_1=φ_2=\ldots=φ_M$ and $θ_1>θ_2>\ldots>θ_M>0$, sending a second command to the mobile terminal, where $φ_i$ is an azimuth at the $i^{th}$ moment, $θ_i$ is an elevation angle at the $i^{th}$ moment, 1≤i≤M, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

Optionally, the sending, by matching the location relationship change information and according to the location relationship change information, a command for controlling the mobile terminal may further include when $0° \leq \varphi_i \leq 90°$, if $\varphi_1 < \varphi_2 < \ldots < \varphi_M$, and $\theta_1 > \theta_2 > \ldots > \theta_M$, sending a first command to the mobile terminal, or if $\varphi_1 > \varphi_2 > \ldots > \varphi_M$, and $\theta_1 < \theta_2 < \ldots < \theta_M$, sending a second command to the mobile terminal; or when $90° \leq \varphi_i \leq 180°$, if $\varphi_1 < \varphi_2 < \ldots < \varphi_M$, and $\theta_1 < \theta_2 < \ldots < \theta_M$, sending a first command to the mobile terminal, or if $\varphi_1 > \varphi_2 > \ldots > \varphi_M$, and $\theta_1 > \theta_2 > \ldots > \theta_M$, sending a second command to the mobile terminal; or when $180° \leq \varphi_i \leq 270°$, if $\varphi_1 < \varphi_2 < \ldots < \varphi_M$, and $\theta_1 > \theta_2 > \ldots > \theta_M$, sending a second command to the mobile terminal, or if $\varphi_1 > \varphi_2 > \ldots > \varphi_M$, and $\theta_1 < \theta_2 < \ldots < \theta_M$, sending a first command to the mobile terminal; or when $270° \leq \varphi_i \leq 360°$, if $\varphi_1 < \varphi_2 < \ldots < \varphi_M$, and $\theta_1 < \theta_2 < \ldots < \theta_M$, sending a second command to the mobile terminal, or if $\varphi_1 > \varphi_2 > \ldots > \varphi_M$, and $\theta_1 > \theta_2 > \ldots > \theta_M$, sending a first command to the mobile terminal, where pi is an azimuth at the $i^{th}$ moment, $\theta_i$ is an elevation angle at the $i^{th}$ moment, $1 \leq i \leq M$, the first command is used to instruct the mobile terminal to control the mobile terminal in a first manner, and the first manner matches a movement trend of the mobile terminal moving from outdoors to indoors; and the second command is used to instruct the mobile terminal to control the mobile terminal in a second manner, and the second manner matches a movement trend of the mobile terminal moving from indoors to outdoors.

Further, the first command is used to instruct the mobile terminal to use an indoor positioning manner; or the first command is used to instruct the mobile terminal to load an indoor navigation map.

The second command is used to instruct the mobile terminal to use an outdoor positioning manner; or the second command is used to instruct the mobile terminal to load an outdoor navigation map.

Further, before receiving the N direction-finding signals that are respectively sent by the mobile terminal at the N moments, the processor further executes establishing a wireless connection between the multiple-antenna node and the mobile terminal.

Further, the multiple-antenna node includes a multiple-antenna Wi-Fi node, or a multiple-antenna BLUETOOTH node.

The multiple-antenna node provided in this embodiment of the disclosure is configured to implement the method shown in the embodiment shown in FIG. 6. For details of an operating principle and an operating process of the multiple-antenna node and technical effects generated by the multiple-antenna node, refer to the embodiment shown in FIG. 6, and the details are not described herein again.

An embodiment of the disclosure provides a control system, including the mobile terminal control apparatus shown in FIG. 7, and a multiple-antenna node control apparatus. The multiple-antenna node control apparatus is configured to respectively send N direction-finding signals to a mobile terminal at N moments.

An embodiment of the disclosure may further provide a control system, including the mobile terminal control apparatus shown in FIG. 8, and the multiple-antenna node control apparatus shown in FIG. 9.

Figure 12:
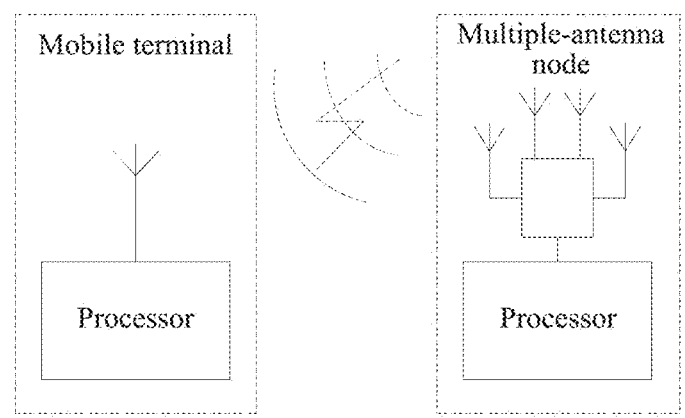
FIG. 12 is a schematic diagram of a control system according to an embodiment of the disclosure.

An embodiment of the disclosure may further provide a control system. As shown in FIG. 12, the control system includes a mobile terminal and a multiple-antenna node. For details of structures, operating principles, and operating processes of the mobile terminal and the multiple-antenna node, refer to descriptions in the foregoing embodiments, and the details are not described herein again.

With descriptions of the foregoing embodiments, a person skilled in the art may clearly understand that the disclosure may be implemented by hardware, firmware or a combination thereof. When the disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a RAM, a ROM, an electrically erasable programmable read-only memory (EEPROM), a compact disc read-only memory (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared light ray, radio and microwave, the coaxial cable, optical fiber/cable, twisted pair, DSL or wireless technologies such as infrared light ray, radio and microwave are included in fixation of a medium to which they belong. For example, a disk and disc used by the disclosure includes a compact disc (CD), a laser disc, an optical disc, a digital versatile disc (DVD), a floppy disk and a Blu-light ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the disclosure, but is not intended to limit the protection scope of the disclosure. Any modification, equivalent replacement, or improvement made without departing from the spirit and principle of the disclosure shall fall within the protection scope of the disclosure.

What is claimed is:

1. A mobile terminal control method, comprising:
   receiving N direction-finding signals from a multiple-antenna node at N moments, wherein the multiple-antenna node is located in an indoor-outdoor critical area;
   obtaining N azimuths $\varphi$ and N elevation angles $\theta$ between the mobile terminal and the multiple-antenna node at the N moments according to the N direction-finding signals, wherein a ground is an x-y plane, wherein a projection of the multiple-antenna node on the x-y plane is an original point, wherein a z-axis is perpendicular to the x-y plane and points upward, wherein a y-axis is parallel to an indoor-outdoor interface, wherein an x-axis is perpendicular to the y-axis and points to an outdoor direction, wherein $\varphi$ is an angle between a straight line k1 and a positive direction of the x-axis, wherein the straight line k1 is a connecting line between a projection of the mobile terminal on the ground and the original point, wherein $\theta$ is an angle between a straight line k2 and a negative direction of the z-axis, wherein the straight line k2 is a connecting line between the mobile terminal and the multiple-antenna node, and wherein the N moments and the N pieces of location relationship information are in a one-to-one correspondence;

determining location relationship change information between the mobile terminal and the multiple-antenna node according to at least M of the N pieces of location relationship information, wherein 2≤M≤N; and controlling the mobile terminal in a manner corresponding to a movement trend matching the location relationship change information.

2. The method of claim 1, wherein controlling the mobile terminal in the manner corresponding to the movement trend matching the location relationship change information comprises:

controlling the mobile terminal in a first manner when $0°≤\varphi_i≤180°$ and $\varphi_1<\varphi_2<\ldots<\varphi_M$;

controlling the mobile terminal in a second manner when $0°≤\varphi_i≤180°$ and $\varphi_1>\varphi_2>\ldots>\varphi_M$;

controlling the mobile terminal in the first manner when $180°≤\varphi_i≤360°$ and $\varphi_1>\varphi_2>\ldots>\varphi_M$;

controlling the mobile terminal in the second manner when $180°≤\varphi_i≤360°$ and $\varphi_1<\varphi_2<\ldots<\varphi_M$;

controlling the mobile terminal in the first manner when $0°≤\varphi_i≤90°$, $\varphi_1=\varphi_2=\ldots=\varphi_M$, and $\theta_1>\theta_2>\ldots>\theta_M>0$;

controlling the mobile terminal in the first manner when $270°≤\varphi_i≤360°$, $\varphi_1=\varphi_2=\ldots=\varphi_M$, and $\theta_1>\theta_2>\ldots>\theta_M>0$;

controlling the mobile terminal in the second manner when $0°≤\varphi_i≤90°$, $\varphi_1=\varphi_2=\ldots=\varphi_M$, and $0<\theta_1<\theta_2<\ldots<\theta_M$;

controlling the mobile terminal in the second manner when $270°≤\varphi_i≤360°$, $\varphi_1=\varphi_2=\ldots=\varphi_M$, and $0<\theta_1<\theta_2<\ldots<\theta_M$;

controlling the mobile terminal in the first manner when $90°≤\varphi_i<270°$, $\varphi_1=\varphi_2=\ldots=\varphi_M$, and $0<\theta_1<\theta_2<\ldots<\theta_M$;

controlling the mobile terminal in the second manner when $90°≤\varphi_i≤270°$, $\varphi_1=\varphi_2=\ldots=\varphi_M$ and $\theta_1>\theta_2>\ldots>\theta_M>0$, wherein $\varphi_i$ is an azimuth at the $i^{th}$ moment, $\theta_i$ is an elevation angle at the $i^{th}$ moment, 1≤i≤M, wherein the first manner matches a movement trend of the mobile terminal moving from outdoors to indoors, and wherein the second manner matches a movement trend of the mobile terminal moving from indoors to outdoors.

3. The method of claim 2, wherein controlling the mobile terminal in the first manner comprises controlling the mobile terminal to use an indoor positioning manner, or controlling the mobile terminal to load an indoor navigation map, and wherein controlling the mobile terminal in the second manner comprises controlling the mobile terminal to use an outdoor positioning manner, or controlling the mobile terminal to load an outdoor navigation map.

4. The method claim 1, wherein controlling the mobile terminal in the manner corresponding to the movement trend matching the location relationship change information comprises:

controlling the mobile terminal in a first manner when $0°≤\varphi_i≤90°$, $\varphi_1<\varphi_2<\ldots<\varphi_M$, and $\theta_1>\theta_2>\ldots>\theta_M$;

controlling the mobile terminal in a second manner when $0°≤\varphi_i≤90°$, $\varphi_1<\varphi_2<\ldots<\varphi_M$, and $\theta_1<\theta_2<\ldots<\theta_M$;

controlling the mobile terminal in the first manner when $90°≤\varphi_i≤180°$, $\varphi_1<\varphi_2<\ldots<\varphi_M$, and $\theta_1<\theta_2<\ldots>\theta_M$;

controlling the mobile terminal in the second manner when $90°≤\varphi_i≤180°$, $\varphi_1>\varphi_2>\ldots>\varphi_M$, and $\theta_1>\theta_2>\ldots>\theta_M$;

controlling the mobile terminal in the second manner when $180°≤\varphi_i≤270°$, $\varphi_1<\varphi_2<\ldots<\varphi_M$, and $\theta_1>\theta_2>\ldots>\theta_M$;

controlling the mobile terminal in the first manner when $180°≤\varphi_i≤270°$, $\varphi_1>\varphi_2>\ldots>\varphi_M$, and $\theta_1<\theta_2<\ldots<\theta_M$;

controlling the mobile terminal in the second manner when $270°≤\varphi_i≤360°$, $\varphi_1<\varphi_2<\ldots<\varphi_M$, and $\theta_1<\theta_2<\ldots<\theta_M$; or controlling the mobile terminal in the first manner when $270°≤\varphi_i≤360°$, $\varphi_1>\varphi_2>\ldots>\varphi_M$, and $\theta_1>\theta_2>\ldots>\theta_M$, wherein $\varphi_i$ is an azimuth at the $i^{th}$ moment, $\theta_i$ is an elevation angle at the $i^{th}$ moment, 1≤i≤M, the first manner matches a movement trend of the mobile terminal moving from outdoors to indoors, and the second manner matches a movement trend of the mobile terminal moving from indoors to outdoors.

5. The method of claim 4, wherein controlling the mobile terminal in the first manner comprises controlling the mobile terminal to use an indoor positioning manner, or controlling the mobile terminal to load an indoor navigation map, and wherein controlling the mobile terminal in the second manner comprises controlling the mobile terminal to use an outdoor positioning manner, or controlling the mobile terminal to load an outdoor navigation map.

6. The method of claim 5, wherein the indoor positioning manner comprises Wi-Fi positioning, BLUETOOTH positioning, magnetic field positioning, or light ray positioning.

7. The method of claim 5, wherein the outdoor positioning manner comprises global navigation satellite system (GNSS) positioning, cellular network positioning, or Wi-Fi positioning.

8. The method of claim 1, wherein before receiving the N direction-finding signals from the multiple-antenna node at the N moments, the method further comprises:

establishing, by the mobile terminal, a wireless connection to the multiple-antenna node when a quantity of visible satellites received by the mobile terminal is less than or equal to a first threshold;

establishing, by the mobile terminal, the wireless connection to the multiple-antenna node when strength of a Wi-Fi or BLUETOOTH signal detected by the mobile terminal is greater than or equal to a second threshold or less than or equal to a third threshold; or establishing, by the mobile terminal, the wireless connection to the multiple-antenna node when a quantity of Wi-Fi access points or a quantity of BLUETOOTH nodes detected by the mobile terminal is greater than or equal to a fourth threshold or less than or equal to a fifth threshold.

9. A mobile terminal, comprising:

a bus;

a processor coupled to the bus;

a memory coupled to the bus; and a communications interface coupled to the processor, the memory, and the bus, wherein the processor, the memory, and the communications interface are configured to communicate with each other using the bus, and wherein the processor is configured to run program code stored in the memory to:

receive N direction-finding signals from a multiple-antenna node at N moments, wherein the multiple-antenna node is located in an indoor-outdoor critical area;

obtain N azimuths φ and N elevation angles θ between the mobile terminal and the multiple-antenna node at the N moments according to the N direction-finding signals, wherein a ground is an x-y plane, wherein a projection of the multiple-antenna node on the x-y plane is an original point, wherein a z-axis is perpendicular to the x-y plane and points upward, wherein a y-axis is parallel to an indoor-outdoor interface, wherein an x-axis is perpendicular to the y-axis and points to an outdoor direction, wherein $\varphi$ is an angle between a straight line k1 and a positive direction of the x-axis, wherein the straight line k1 is a connecting line between a projection of the mobile terminal on the ground and the original point, wherein $\theta$ is an angle between a straight line k2 and a negative direction of the z-axis, wherein the straight line k2 is a connecting line between the mobile terminal and the multiple-antenna node, and wherein the N moments and the N pieces of location relationship information are in a one-to-one correspondence;

determine location relationship change information between the mobile terminal and the multiple-antenna node according to at least M of the N pieces of location relationship information, wherein 2≤M≤N; and control the mobile terminal in a manner corresponding to a movement trend matching the location relationship change information.

10. The mobile terminal of claim 9, wherein controlling the mobile terminal in the manner corresponding to the movement trend matching the location relationship change information comprises:

controlling the mobile terminal in a first manner when $0°≤\varphi_i≤180°$ and $\varphi_1<\varphi_2<\ldots<\varphi_M$;

controlling the mobile terminal in a second manner when $0°≤\varphi_i≤180°$ and $\varphi_1>\varphi_2>\ldots>\varphi_M$;

controlling the mobile terminal in the first manner when $180°≤\varphi_i≤360°$ and $\varphi_1>\varphi_2>\ldots>\varphi_M$;

controlling the mobile terminal in the second manner when $180°≤\varphi_i≤360°$ and $\varphi_1<\varphi_2<\ldots<\varphi_M$;

controlling the mobile terminal in the first manner when $0°≤\varphi_i≤90°$, $\varphi_1=\varphi_2=\ldots=\varphi_M$, and $\theta_1>\theta_2>\ldots>\theta_M>0$;

controlling the mobile terminal in the first manner when $270°≤\varphi_i≤360°$, $\varphi_1=\varphi_2=\ldots=\varphi_M$, and $\theta_1>\theta_2>\ldots>\theta_M>0$;

when $0°≤\varphi_i≤90°$, $\varphi_1=\varphi_2=\ldots=\varphi_M$, and $0<\theta_1<\theta_2<\ldots<\theta_M$, controlling the mobile terminal in the second manner;

controlling the mobile terminal in the second manner when $270°≤\varphi_i≤360°$, $\varphi_1=\varphi_2=\ldots=\varphi_M$, and $0<\theta_1<\theta_2<\ldots<\theta_M$;

controlling the mobile terminal in the first manner when $90°≤\varphi_i≤270°$, $\varphi_1=\varphi_2=\ldots=\varphi_M$, and $0<\theta_1<\theta_2<\ldots<\theta_M$; or controlling the mobile terminal in the second manner when $90°≤\varphi_i≤270°$, $\varphi_1=\varphi_2=\ldots=\varphi_M$ and $\theta_1>\theta_2>\ldots>\theta_M>0$, wherein $\varphi_i$ is an azimuth at the $i^{th}$ moment, $\theta_i$ is an elevation angle at the $i^{th}$ moment, 1≤i≤M, wherein the first manner matches a movement trend of the mobile terminal moving from outdoors to indoors, and wherein the second manner matches a movement trend of the mobile terminal moving from indoors to outdoors.

11. The mobile terminal of claim 10, wherein controlling the mobile terminal in the first manner comprises controlling the mobile terminal to use an indoor positioning manner, or controlling the mobile terminal to load an indoor navigation map, and wherein controlling the mobile terminal in the second manner comprises controlling the mobile terminal to use an outdoor positioning manner, or controlling the mobile terminal to load an outdoor navigation map.

12. The mobile terminal of claim 9, wherein controlling the mobile terminal in the manner corresponding to the movement trend matching the location relationship change information comprises:

controlling the mobile terminal in a first manner when $0°≤\varphi_i≤90°$, $\varphi_1<\varphi_2<\ldots<\varphi_M$, and $\theta_1>\theta_2>\ldots>\theta_M$;

controlling the mobile terminal in a second manner when $0°≤\varphi_i≤90°$, $\varphi_1>\varphi_2>\ldots>\varphi_M$, and $\theta_1<\theta_2<\ldots<\theta_M$;

controlling the mobile terminal in the first manner when $90°≤\varphi_i≤180°$, $\varphi_1<\varphi_2<\ldots<\varphi_M$, and $\theta_1<\theta_2<\ldots<\theta_M$;

controlling the mobile terminal in the second manner when $90°≤\varphi_i≤180°$, $\varphi_1>\varphi_2>\ldots>\varphi_M$, and $\theta_1>\theta_2>\ldots>\theta_M$;

controlling the mobile terminal in the second manner when $180°≤\varphi_i≤270°$, $\varphi_1<\varphi_2<\ldots<\varphi_M$, and $\theta_1>\theta_2>\ldots>\theta_M$;

controlling the mobile terminal in the first manner when $180°≤\varphi_i≤270°$, $\varphi_1>\varphi_2>\ldots>\varphi_M$, and $\theta_1<\theta_2<\ldots<\theta_M$;

controlling the mobile terminal in the second manner when $270°≤\varphi_i≤360°$, $\varphi_1<\varphi_2<\ldots<\varphi_M$, and $\theta_1<\theta_2<\ldots<\theta_M$; or controlling the mobile terminal in a first manner when $270°≤\varphi_i≤360°$, $\varphi_1>\varphi_2>\ldots>\varphi_M$, and $\theta_1>\theta_2>\ldots>\theta_M$, wherein $\varphi_i$ is an azimuth at the $i^{th}$ moment, $\theta_i$ is an elevation angle at the $i^{th}$ moment, 1≤i≤M, wherein the first manner matches a movement trend of the mobile terminal moving from outdoors to indoors, and wherein the second manner matches a movement trend of the mobile terminal moving from indoors to outdoors.

13. The mobile terminal of claim 12, wherein controlling the mobile terminal in the first manner comprises controlling the mobile terminal to use an indoor positioning manner, or controlling the mobile terminal to load an indoor navigation map, and wherein controlling the mobile terminal in the second manner comprises controlling the mobile terminal to use an outdoor positioning manner, or controlling the mobile terminal to load an outdoor navigation map.

14. The mobile terminal of claim 9, wherein before receiving the N direction-finding signals from the multiple-antenna node at the N moments, the processor is further configured to run the program code to:

establish a wireless connection to the multiple-antenna node when a quantity of visible satellites received by the mobile terminal is less than or equal to a first threshold; or establish the wireless connection to the multiple-antenna node when strength of a Wi-Fi signal detected by the mobile terminal is greater than or equal to a second threshold or less than or equal to a third threshold; or establish the wireless connection to the multiple-antenna node when a quantity of Wi-Fi access points or a quantity of BLUETOOTH nodes detected by the mobile terminal is greater than or equal to a fourth threshold or less than or equal to a fifth threshold.

15. The mobile terminal of claim 12, wherein the indoor positioning manner comprises Wi-Fi positioning, BLUETOOTH positioning, magnetic field positioning, or light ray positioning, or wherein the outdoor positioning manner comprises global navigation satellite system (GNSS) positioning, cellular network positioning, or Wi-Fi positioning.

16. A computer program product comprising computer-executable instructions for storage on a non-transitory computer-readable medium that, when executed by a processor cause an apparatus to:

receive N direction-finding signals from a multiple-antenna node at N moments, wherein the multiple-antenna node is located in an indoor-outdoor critical area;

obtain N azimuths φ and N elevation angles θ between the mobile terminal and the multiple-antenna node at the N moments according to the N direction-finding signals, wherein a ground is an x-y plane, wherein a projection of the multiple-antenna node on the x-y plane is an original point, wherein a z-axis is perpendicular to the x-y plane and points upward, wherein a y-axis is parallel to an indoor-outdoor interface, wherein an x-axis is perpendicular to the y-axis and points to an outdoor direction, wherein φ is an angle between a straight line k1 and a positive direction of the x-axis, wherein the straight line k1 is a connecting line between a projection of the mobile terminal on the ground and the original point, wherein θ is an angle between a straight line k2 and a negative direction of the z-axis, wherein the straight line k2 is a connecting line between the mobile terminal and the multiple-antenna node, and wherein the N moments and the N pieces of location relationship information are in a one-to-one correspondence;

determine location relationship change information between the mobile terminal and the multiple-antenna node according to at least M of the N pieces of location relationship information, wherein $2 \leq M \leq N$; and control the mobile terminal in a manner corresponding to a movement trend matching the location relationship change information.

17. The computer program product of claim 16, wherein controlling the mobile terminal in the manner corresponding to the movement trend matching the location relationship change information comprises:

controlling the mobile terminal in the manner corresponding to the movement trend matching the location relationship change information comprises:

controlling the mobile terminal in a first manner when $0° \leq \varphi_i \leq 180°$ and $\varphi_1 < \varphi_2 < \ldots < \varphi_M$;

controlling the mobile terminal in a second manner when $0° \leq \varphi_i \leq 180°$ and $\varphi_1 > \varphi_2 > \ldots > \varphi_M$;

controlling the mobile terminal in the first manner when $180° \leq \varphi_i \leq 360°$ and $\varphi_1 > \varphi_2 > \ldots \varphi_M$;

controlling the mobile terminal in the second manner when $180° \leq \varphi_i \leq 360°$ and $\varphi_1 < \varphi_2 < \ldots < \varphi_M$;

controlling the mobile terminal in the first manner when $0° \leq \varphi_i \leq 90°$, $\varphi_1 = \varphi_2 = \ldots = \varphi_M$, and $\theta_1 > \theta_2 > \ldots > \theta_M > 0$;

controlling the mobile terminal in the first manner when $270° \leq \varphi_i \leq 360°$, $\varphi_1 = \varphi_2 = \ldots = \varphi_M$, and $\theta_1 > \theta_2 > \ldots > \theta_M > 0$;

when $0° \leq \varphi_i \leq 90°$, $\varphi_1 = \varphi_2 = \ldots = \varphi_M$, and $0 < \theta_1 < \theta_2 < \ldots < \theta_M$, controlling the mobile terminal in the second manner;

controlling the mobile terminal in the second manner when $270° \leq \varphi_i \leq 360°$, $\varphi_1 = \varphi_2 = \ldots = \varphi_M$, and $0 < \theta_1 < \theta_2 < \ldots < \theta_M$;

controlling the mobile terminal in the first manner when $90° \leq \varphi_i < 270°$, $\varphi_1 = \varphi_2 = \ldots = \varphi_M$, and $0 < \theta_1 < \theta_2 < \ldots < \theta_M$; or controlling the mobile terminal in the second manner when $90° \leq \varphi_i \leq 270°$, $\varphi_1 = \varphi_2 = \ldots = \varphi_M$ and $\theta_1 > \theta_2 > \ldots > \theta_M > 0$, wherein $\varphi_i$ is an azimuth at the $i^{th}$ moment, A, is an elevation angle at the $i^{th}$ moment, $1 \leq i \leq M$, wherein the first manner matches a movement trend of the mobile terminal moving from outdoors to indoors, and wherein the second manner matches a movement trend of the mobile terminal moving from indoors to outdoors.

18. The computer program product of claim 17, wherein controlling the mobile terminal in the first manner comprises controlling the mobile terminal to use an indoor positioning manner, or controlling the mobile terminal to load an indoor navigation map, and wherein controlling the mobile terminal in the second manner comprises controlling the mobile terminal to use an outdoor positioning manner, or controlling the mobile terminal to load an outdoor navigation map.

19. The computer program product of claim 16, wherein controlling the mobile terminal in the manner corresponding to the movement trend matching the location relationship change information comprises:

controlling the mobile terminal in a first manner when $0° \leq \varphi_i \leq 90°$, $\varphi_1 < \varphi_2 < \ldots < \varphi_M$, and $\theta_1 > \theta_2 > \ldots > \theta_M$;

controlling the mobile terminal in a second manner when $0° \leq \varphi_i \leq 90°$, $\varphi_1 > \varphi_2 > \ldots > \varphi_M$, and $\theta_1 < \theta_2 < \ldots < \theta_M$;

controlling the mobile terminal in the first manner when $90° \leq \varphi_i \leq 180°$, $\varphi_1 < \varphi_2 < \ldots < \varphi_M$, and $\theta_1 < \theta_2 < \ldots < \theta_M$;

controlling the mobile terminal in the second manner when $90° \leq \varphi_i \leq 180°$, $\varphi_1 > \varphi_2 > \ldots > \varphi_M$, and $\theta_1 > \theta_2 > \ldots > \theta_M$;

controlling the mobile terminal in the second manner when $180° \leq \varphi_i \leq 270°$, $\varphi_1 < \varphi_2 < \ldots < \varphi_M$, and $\theta_1 > \theta_2 > \ldots > \theta_M$;

controlling the mobile terminal in the first manner when $180° \leq \varphi_i \leq 270°$, $\varphi_1 > \varphi_2 > \ldots > \varphi_M$, and $\theta_1 < \theta_2 < \ldots < \theta_M$;

controlling the mobile terminal in the second manner when $270° \leq \varphi_i \leq 360°$, $\varphi_1 < \varphi_2 < \ldots < \varphi_M$, and $\theta_1 < \theta_2 < \ldots < \theta_M$; or controlling the mobile terminal in a first manner when $270° \leq \varphi_i \leq 360°$, $\varphi_1 > \varphi_2 > \ldots > \varphi_M$, and $\theta_1 > \theta_2 > \ldots < \theta_M$, wherein $\varphi_i$ is an azimuth at the $i^{th}$ moment, $\theta_i$ is an elevation angle at the $i^{th}$ moment, $1 \leq i \leq M$, wherein the first manner matches a movement trend of the mobile terminal moving from outdoors to indoors, and wherein the second manner matches a movement trend of the mobile terminal moving from indoors to outdoors.

20. The computer program product of claim 19, wherein controlling the mobile terminal in the manner corresponding to the movement trend matching the location relationship change information comprises:

controlling the mobile terminal to use an indoor positioning manner, or controlling the mobile terminal to load an indoor navigation map, and wherein controlling the mobile terminal in the second manner comprises controlling the mobile terminal to use an outdoor positioning manner, or controlling the mobile terminal to load an outdoor navigation map.

* * * * *

UNITED STATES PATENT AND TRADEMARK OFFICE
CERTIFICATE OF CORRECTION

PATENT NO. : 10,718,871 B2  
APPLICATION NO. : 15/577120  
DATED : July 21, 2020  
INVENTOR(S) : Henghui Lu Page 1 of 1

It is certified that error appears in the above-identified patent and that said Letters Patent is hereby corrected as shown below:

In the Claims

Claim 2, Column 43, Line 37: "<270°" should read "≤270°"

Claim 4, Column 43, Line 62: "$\varphi_i > \varphi_2 > ... > \varphi_M$" should read "$\varphi_1 > \varphi_2 > ... > \varphi_M$"

Claim 4, Column 43, Line 64: "$\theta_1 < \theta_2 > ... > \theta_M$" should read "$\theta_1 < \theta_2 < ... < \theta_M$"

Claim 10, Column 45, Line 49: "$< ... << \theta_M$" should read "$< ... < \theta_M$"

Claim 17, Column 47, Line 58: "<270°" should read "≤270°"

Claim 17, Column 48, Line 4: "moment, A, is an" should read "moment, $\theta_i$ is an"

Claim 19, Column 48, Line 27: "90°≤$\varphi_1$≤180°," should read "90°≤$\varphi_i$≤180°,"

Claim 19, Column 48, Line 40: "$\theta_1 > \theta_2 < ... < \theta_M$" should read "$\theta_1 > \theta_2 > ... > \theta_M$"

Signed and Sealed this  
Twenty-fifth Day of August, 2020

Andrei Iancu  
*Director of the United States Patent and Trademark Office*